United States Patent [19]

Arciprete et al.

[11] 3,821,710

[45] June 28, 1974

[54] MULTIMODE SEARCH AND RETRIEVAL TAPE SYSTEM

[75] Inventors: Genio R. Arciprete, Lexington; Peter G. Martin, Arlington, both of Mass.

[73] Assignee: Arthur D. Little Inc., Cambridge, Mass.

[22] Filed: Dec. 4, 1972

[21] Appl. No.: 311,489

[52] U.S. Cl. .......................... 340/172.5, 340/174.1

[51] Int. Cl. .......................... G06f 3/06, G11b 15/00

[58] Field of Search... 340/172.5, 174.1 R, 174.1 C, 340/174.1 J; 197/19, 20

[56] References Cited

UNITED STATES PATENTS

| | | | |
|---|---|---|---|
| 3,541,271 | 11/1970 | Joslow et al. | 340/174.1 C |
| 3,641,504 | 2/1972 | Sidline | 340/172.5 |
| 3,699,527 | 10/1972 | Duerden | 340/172.5 |
| 3,727,203 | 4/1973 | Crossman | 340/174.1 J |
| 3,728,685 | 4/1973 | Stalnert | 340/172.5 |
| 3,745,531 | 7/1973 | Staas, Jr. | 340/172.5 |

*Primary Examiner*—Raulfe B. Zache
*Assistant Examiner*—John P. Vandenburg
*Attorney, Agent, or Firm*—Schiller & Pandiscio

[57] ABSTRACT

A word processing system that includes a mass storage means in which data is stored in blocks containing a plurality of characters with each data block having a unique address number code associated with it, means for searching the mass storage means to locate individual data blocks by reference to the address numbers, and means for displaying the address number of each data block from which data is being retrieved. The system has the capability of searching the mass storage means at a high or a slow speed in forward and reverse directions, and includes means, operative upon termination of searching in the fast forward, fast reverse and slow reverse modes, for automatically shifting to the slow forward speed mode and for thereafter terminating searching in the slow forward speed mode after a single address code and all of the data in the data block associated with that single address code have been read out. The means for displaying the address numbers is coupled responsively to a counter that is incrementated or decremented by one count each time an address code is detected during searching in the fast forward, fast reverse and slow reverse modes and is preset to the stored address number during searching in the slow forward mode.

21 Claims, 14 Drawing Figures

MULTIMODE SEARCH AND RETRIEVAL TAPE SYSTEM

The invention relates to data processing systems in which data are recorded in and retrieved from a mass storage means and is particularly applicable to word processing systems employing a typewriter as an input/output terminal coupled with an electronic memory and a control system.

This invention relates more particularly to data processing systems where data are stored in a storage medium, such as a magnetic tape, in blocks containing many characters or bytes, with each data block having a unique identifying address code associated with it.

In many applications it is desirable for the system user to have the ability to search for or locate a particular data block by reference to its associated address number. It is also often desirable to be able to vary the search speed of the mass storage means so that a high speed can be used to cover a relatively large number of data blocks in a short time and so that a slow speed can be used to locate a particular data block and to effect recording or retrieval of data from that particular data block.

It is a primary object of this invention to provide means for identifying each data block on an elongate storage medium by means of a unique address code. A further object of this invention is to provide means for continuously displaying the address code associated with a data block with respect to which data is or about to be recorded or retrieved. Still another object of this invention is to provide means for searching for or locating any data block in a mass storage means, provided that its address code is known. Yet another object of the invention is to provide means for searching for a data block with the elongate storage medium traveling at a relatively high speed with respect to data detecting means employed to retrieve data from the storage medium, and also when the storage medium is traveling at a relatively slow speed.

Another principal object of the invention is to provide a word processing system that includes a mass storage means and means for searching for and locating particular data blocks in the mass storage means by reference to distinguishing address numbers associated with the data blocks, the apparatus also having the ability to vary the speed at which the mass storage means is searched and to display address numbers associated with data blocks from which data is being retrieved.

The foregoing objects and other objects which are hereinafter disclosed or rendered obvious are achieved by a preferred embodiment hereinafter disclosed which is a word processor that employs a typewriter as the input/output device and a magnetic tape as a mass storage means for blocks of data which normally correspond to a line of type. An address number is associated with each data block and means are provided for displaying each address number in a meaningful way as the associated data block is located. A group of tape search controls is provided so that the operator can locate a data block by displacing the magnetic tape forwardly or backwardly, and selectively at a high speed or a slow speed. The address number display is connected to a counter which can be controlled in at least four modes. In the first mode, the counter is incremented by one count each time an address code is passed over during a high speed forward search. In the second and third modes, the counter is decremented by one count each time an address code is passed over during a high speed reverse search or a slow speed reverse search respectively. In the fourth mode, the counter is preset so that its count corresponds to the stored address number read from the magnetic tape and interpreted as the system executes a slow speed forward search.

The hereinafter described preferred embodiment of the invention is a word processor in which the input/output device is an electronically-controlled typewriter such as the type described in U.S. Pat. No. 2,919,002 (issued to L. E. Palmer) and in which the mass storage means comprises magnetic tape.

The invention accordingly comprises the features of construction, combination of elements and arrangement of parts which are exemplified in the following detailed disclosure, and the scope of the invention as indicated by the appended claims. For a fuller understanding of the nature and objects of the present invention, reference should be had to the following detailed description taken in connection with the accompanying drawings wherein:

Figure 1:
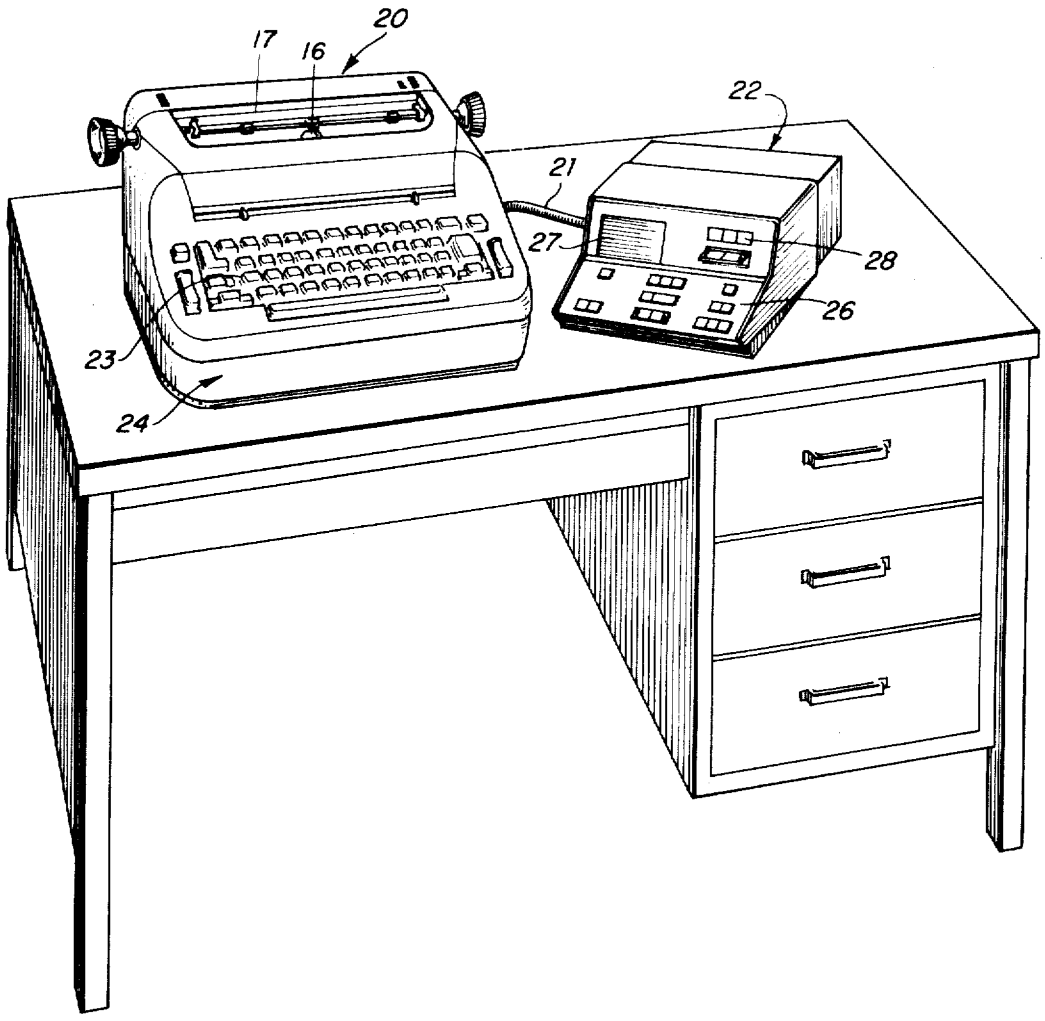
FIG. 1 is a perspective illustration of a typewriter and coupled console embodying the principles of the present invention.

Referring now to the drawings, there is shown in FIG. 1 a preferred arrangement of equipment in which the invention is incorporated. The apparatus of the invention includes an input/output printer 20 interconnected by an electrically conductive cable 21 to a control console unit 22 for controlling recording, reproducing, and editing. Printer 20 typically includes a manually operable keyboard 23 for controlling a single head printer of the Palmer-type which has been adapted (for example, by being emplaced on a baseplate 24 which is capable of detecting the condition of the latch and cycle shaft switches in the printer and also having solenoids capable of driving the latches and cycle shaft of the printer) for producing an output indicative of the condition of those switches. Such a baseplate is described in U.S. Pat. Nos. 3,452,851 and 3,453,379 issued to L. Holmes, Jr. In printers of the Palmer type each character is automatically encoded when typed. When such a printer is combined with a Holmes type baseplate the combination will be capable of translating or interconverting formation of typed characters and performance of printing functions with corresponding coded character and function signals.

Figure 2:
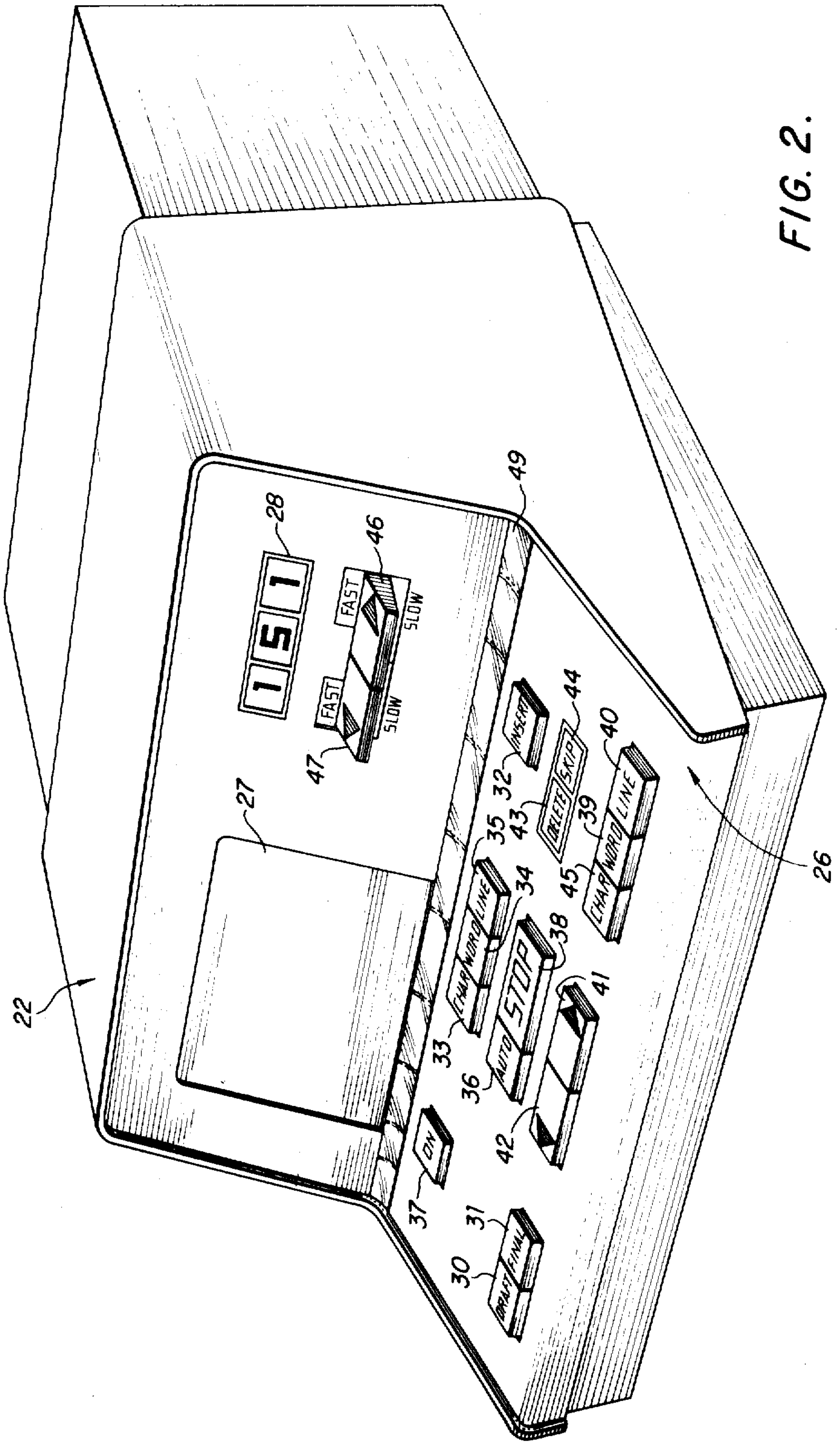
FIG. 2 is an enlarged view of the console of FIG. 1 showing various control buttons, displays and other elements.
Figure 2A:
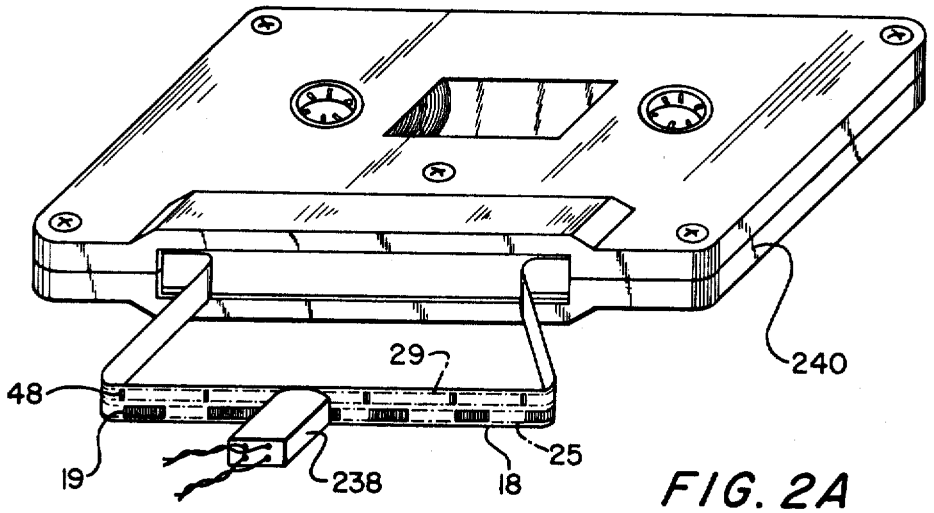
FIG. 2A is a perspective view of a standard tape cassette illustrating in phantom, the organization of information on the tape according to the principles of the present invention.

Unit 22 has a control panel 26 shown in more detail in FIG. 2, the panel including a spring-loaded, normally closed cassette door 27 which is moveable so that a magnetic tape cassette 240 (shown in more detail in FIG. 2A) can be loaded into a tape transport mechanism located behind the door. Adjacent door 27 is a display 28 for indicating a record number corresponding to the position of a data location on the tape 18 in a cassette 240 which may be loaded into the machine. On control panel 26 are also a number of keys or buttons and display lights associated with data entry, editing and playback. The system of the invention is intended to have three basic operating modes, a draft mode, a final mode and in insert mode. To provide for selection of the mode of operation of this system there are provided a Draft button 30, a Final button 31, and an Insert button 32. To provide for control of printing out onto the printer of a character, word, or line from storage, either while the system is in draft or final mode, there are included a Character button 33, a Word button 34, and a Line button 35, plus an Automatic button 36 for allowing the system to print continuously. An On button 37 is also provided for starting the system. Stop button 38 is included for stopping any printing operation by the machine. The deleting or skipping of characters, words and lines respectively is provided by manipulation of Character, Word and Line buttons 45, 39 and 40.

A brief description of the functional consequences of the operation of the various buttons on control panel 26 will be helpful in understanding the detailed structural description of the device. It is intended that the system be capable of both recording data onto a cassette 240 or playing data from a cassette 240 onto printer 20 when operating in the draft mode. Specifically, it is intended during draft mode operation that any data entered by manipulation of keyboard 23 of printer 20 should be stored in a magnetic storage or record in the system with any previously recorded characters being overwritten by new data being stored at the same data locations. In order to accomplish this end one need merely start the system, select the record location, press Draft button 30 and proceed to type in data on the keyboard. To cause the data thus stored to actuate printer 20 and therefore to be typed out, it is only necessary to return to the beginning of the stored data to push Character button 33 to obtain print out of a single character, to push Word button 34 to obtain a single word, to push Line button 35 to obtain a single line, or to push Automatic button 36 to permit the entire stored data to be reproduced on printer 20.

If one should now press Final button 31, the system is conditioned so that no storage of data manually typed or entered on printer 20 can occur, but that only the data stored in the machine can be played out on printer 20. When playing in the Final mode it will be later seen that an automatic right margin control system operates. The Draft and Final modes of operation are mutually exclusive and the system provides that if either the Draft or Final buttons are pushed, the machine is switched from the one to the other mode of operation.

Depression of Insert button 32 while the system is in the Final mode will be ineffective, i.e., will not in any sense allow the machine to operate other than in normal Final Mode operation. On the other hand, if the Insert button 32 is depressed while the system is in the Draft mode, the system switches to an Insert Mode of operation, and if desired, visual indication can be given that the machine is in an Insert Mode, as by lighting Insert button 32 or the like. The Insert Mode is intended to provide an operation such that data entered on printer 20 by manual operation of the keyboard 23 will be inserted into storage, up to a limit, without overwriting or otherwise destroying previously stored data. Only typing and recording can take place while in the Insert Mode since pushing any other buttons (except the Draft or Final buttons) on the control panel will cause the machine to trip out of the Insert mode and revert to the Draft mode. If Insert button 32 is pushed again, the system will switch out of the Insert Mode back to the Draft Mode and, of course, any visual indication of Insert Mode operation will terminate. If Final button 31 is pressed, the system will switch to Final mode operation.

The play or print buttons 33, 34, 35, 36 or 38 control the extent to which data will be read out of storage, either in Draft or Final mode operation, and displayed on printer 20. Each time Character button 33 is pushed, the next character in storage will be read out on printer 20. Similarly, depression of Word button 34 or Line button 35 will cause the next word or line in storage to be read out on the printer. When the Automatic button 36 is pushed, the system will cause the printer 20 to type out the data in storage continuously until some stopping command occurs. The latter can be obtained by pressing Stop button 38, or by certain special conditions which will be described hereinafter.

Step Right and Step Left buttons 41 and 42 control the shifting of data in storage. Each time either is pushed the data in storage is shifted by one character in the appropriate direction and the single print head 16 or carrier on the printer 20 similarly steps. In this respect buttons 41 and 42 actuate the print head 16 to move in the same manner as the space bar and backspace key on the printer keyboard 23, with certain exceptions as will be explained later. Preferably, if one of the buttons 41 and 42 is held down, repetitive action is initiated so that the system steps sequentially character by character.

As described, there are three delete/skip buttons 45, 39 and 40. When the system is in Draft mode depression of these buttons will serve to delete a recorded character, word or line from storage. When the system instead is in the Final mode, these buttons act as skip buttons which cause the system to skip the appropriate character, word or line in storage without overwriting or otherwise destroying the skipped data. Because the functioning of these buttons to cause either deletion or skipping depends upon the mode in which the system is then operating, means are provided in the form of visual indicating lights 43 and 44 which respectively light up to indicate the nature of the function of the buttons, i.e., delete or skip as the case may be.

There are two buttons for controlling tape motion, a Tape Forward button 46 and a Tape Back button 47. These are preferably of the spring-loaded type and each has a first or up position and a second or down position. Pushing either of the tape buttons 46 or 47 to its down position causes the system to move the tape 18 either back or forward (as the case may be) to the beginning of the next of a number of predetermined data blocks 19 or stations on the tape 18. This motion from predetermined station to predetermined station on the tape 18 will continue as a smooth sequence until the appropriate button is released. After release of the button, the motion of the tape 18 in the cassette 240 will continue until the next predetermined station on the tape 18 is reached, at which time the motion of the tape 18 is stopped. Similarly pushing either buttons 46 or 47 to their up position causes the system to shift to a fast forward or fast rewind movement (as the case may be) during which the tape winds continuously. Fast winding due to pushing the Tape Back button 47 to its up position will continue until the button 47 is released, at which point the system then shifts to slow forward speed and continues to move the tape until the next predetermined station on the tape is located. A similar operation in the opposite direction is effected by manipulation of the Tape Forward button.

In the preferred embodiment the cassette tape is at least a two track (25 and 29) tape, and two read/write heads, one for each of tracks 25 and 29, (or a single two-channel head such as head 238) are incorporated into the system. One of the tracks, 25, of the tape is for the data to be stored. The other tape track 29 is intended to contain data addresses 48, preferably in the form of coded conversions of sequentially numbered three decimal digits, each data address 48 being physically located substantially adjacent the beginning of a data block 19 on track 25. Thus, when the tape is moved either forward or back in the cassette, circuitry associated with the address read/write head and the record number display 28 will cause the latter to be appropriately indexed each time an address corresponding to a data block 19 or record moves past the read head. If desired, one can provide an erase mechanism associated with the tape transport mechanism and the control panel so as to erase selectively all data from the tape 18, and also if desired to regenerate the addresses on the tape 18.

Also in the preferred embodiment, associated with the control panel are a number of visual indicators or special lights 49 in addition to the delete/skip light and insert indicator light discussed earlier. These additional lights will be described later hereinafter. Similarly, a number of audio-signal devices to indicate certain conditions of the apparatus can also be provided and will be described hereinafter.

The operation of the device thus described can be advantageously described in connection with a typewriter as an example of the printer. There are three basic situations to be described:

1. Basic entering of data through the typewriter keyboard, i.e. recording an initial draft;

2. Insertion, deletion and other operations made on data after entry of the latter, i.e., editing; and 3. Data retrieval, i.e. typing of final copy.

In order to record data initially, the operator will first activate the typewriter and also will depress button 37 to turn on the remainder of the system. The operator should first set margins and tabs on the typewriter as desired although one or more embodiments of the invention may include the ability to set and clear tabs on the basis of prior stored information. Then a magnetic tape cassette 240 is placed in the carrier behind door 27 and the operator then depresses button 30 to place the system in the draft mode of operation. The position of the tape 18 in the cassette 240 will be indicated by the address displayed at display 28. If the cassette is not rewound and it is desired to start from the beginning of the cassette, the latter can be rewound by pushing Tape Back button 47 to its up position and waiting until rewind is completed. If the operator wishes to start beyond previously recorded material that is to be preserved, the tape 18 can be moved with buttons 46 and 47 until the appropriate address is noticed at display 28.

Hereafter, recording in the Draft mode is accomplished automatically merely by typing the desired information on the typewriter keyboard 23. Each time the operator types a Carrier Return, the data associated with the preceding typed line is then transferred from the buffer memory of the system onto magnetic tape 18. If the operator observes that a wrong key has been struck, correction can be made by depressing the Step Left button 42 which causes the typewriter to automatically backspace. When the typewriter has been backspaced to the error, the operator can strike over the error with the correct character key. To get back to the point where recording had been interrupted, the Step Right button 41 can be depressed, or as will appear later, one can play out the intervening material which has been recorded, or lastly one can retype the intervening material and rerecord it.

If the operator wishes to underscore a word upon entry, the word can be typed and then, using the regular backspace key on the typewriter keyboard which will provide a recorded backspace, the typewriter should be backed up to the beginning of the word. The word can then be underscored, the underscoring being recorded also.

When the operator has completed the draft, a Stop Code should be entered. The Stop Code is generated by depressing the shift key and striking Stop button 38 on the control panel.

Editing of a draft can be done in three basic ways:

1. A new draft can be generated in the Draft mode of operation, combining the desired parts of the old draft with typed and recorded corrections;

2. Only specific lines requiring editing can be modified; or

3. A final copy can be generated in the Final mode of operation with corrections being entered on the copy as the document is printed, without recording the corrections.

Normally, the first approach would be used especially if further author revisions are anticipated. The third approach is appropriate if only final, minor corrections are to be made and a final copy is desired.

In generating a new draft, the following situations are likely to be encountered. First, one can edit simple typographical errors by playing back the tape 18 in the Draft mode, by first striking any one of buttons 33, 34, 35 or 36. This will cause the material recorded on the cassette to be played back on the typewriter, assuming of course that the cassette 240 has been rewound to the appropriate starting position. The material is then played up to but not through the error and the error is corrected by overstriking. Overstriking using the keyboard 23 will automatically erase the erroneous material from the system and insert the corrected material in the appropriate place.

If the error in the draft is surplusage of material such as an extra letter or the like, it can be corrected by playing the material out on the printer 20 up to but not through the extra matter. The latter can now be deleted by simply pressing the appropriately selected one of Delete/Skip buttons 45, 39 or 40 inasmuch as these buttons generate signals to place the system in condition to delete the material when the system is also in the Draft mode.

If the error in the Draft mode is due to missing material, the latter can be added by playing out the recorded material (in the Draft mode) up to the appropriate position, pushing Insert Button 32 and typing on keyboard 23 the missing characters or words. The machine can then be taken out of the Insert mode simply by pushing any of the buttons 33 to 36 inclusive, all of which when actuated switch the system back to the Draft mode of operation.

Final copy can be typed in either the Draft or Final mode. In typing out copy, the basic difference in operation between the two modes is simply that in the Draft mode the system will execute each carrier return signal that has been recorded whereas, in the Final mode the carrier returns may or may not be executed depending upon the operation of an automatic right margin control feature.

If no further editing is required, the operator merely inserts paper into the printer 20, sets the tabs and margins of the latter, puts the cassette 240 into the machine, and moves it to the beginning of the document with buttons 46 and 47. The machine then is placed in automatic play by striking Automatic button 36. The material or text stored in the machine will now be played out on the printer 20 on a substantially continuous basis until the printing is stopped by either striking Stop button 38 or because the operator has preferably recorded an appropriate Stop Code at the end of each page of text. If manual entry of certain material such as the name and address of the person to whom a letter is to be sent is to be inserted on the final copy, a Stop Code should have been recorded when the original draft was recorded so that automatic printing stops at the point where the special material is to be manually entered. In order to prevent a recording of the manually entered material if the system is not operating in the Final mode, the system should then be switched temporarily to that mode of operation by depressing button 31.

If the final copy is being printed out in the Final mode of operation, the system will stop printing whenever it detects that it cannot automatically find a carrier return opportunity such as a recorded Carrier Return or Space or Hyphen signal in a predetermined return zone adjacent the right margin of the printed text. When this occurs, the operator may use key 33 to cause machine printing, charcter by character, up to the point where a Hyphen and a Carrier Return can be manually entered on the keyboard 23 after which automatic typing can then be reinitiated, e.g., by again depressing the Automatic key 36. Normally, this manually entered Hyphen and Carrier Return will not be recorded so that any reruns from the same tape will encounter the same stopping conditions. If, however, the operator wishes to record the Hyphen and Carrier Return, this may be done by pressing Draft button 30 and Insert button 32, typing the Hyphen and Carrier Return, then pushing Final button 31 to switch the system operation back to Final mode, and finally pushing one of the buttons 33–36 inclusive to resume printing. As long as no further changes are made in the paragraph up to this point, subsequent reruns will always find the Carrier Return and hyphen when needed and will continue playing without automatically stopping.

In typing final copy, it may be necessary to make some minor corrections in the recorded material. As long as these changes need not be recorded on the tape, the procedure is simple while operating in the Final mode. Simply by depressing any of the Delete/Skip buttons, 39, 40 and 45, one may cause the system to skip over unwanted characters, words, or lines in the material being played back and additional material may be manually typed in.

Figure 3:
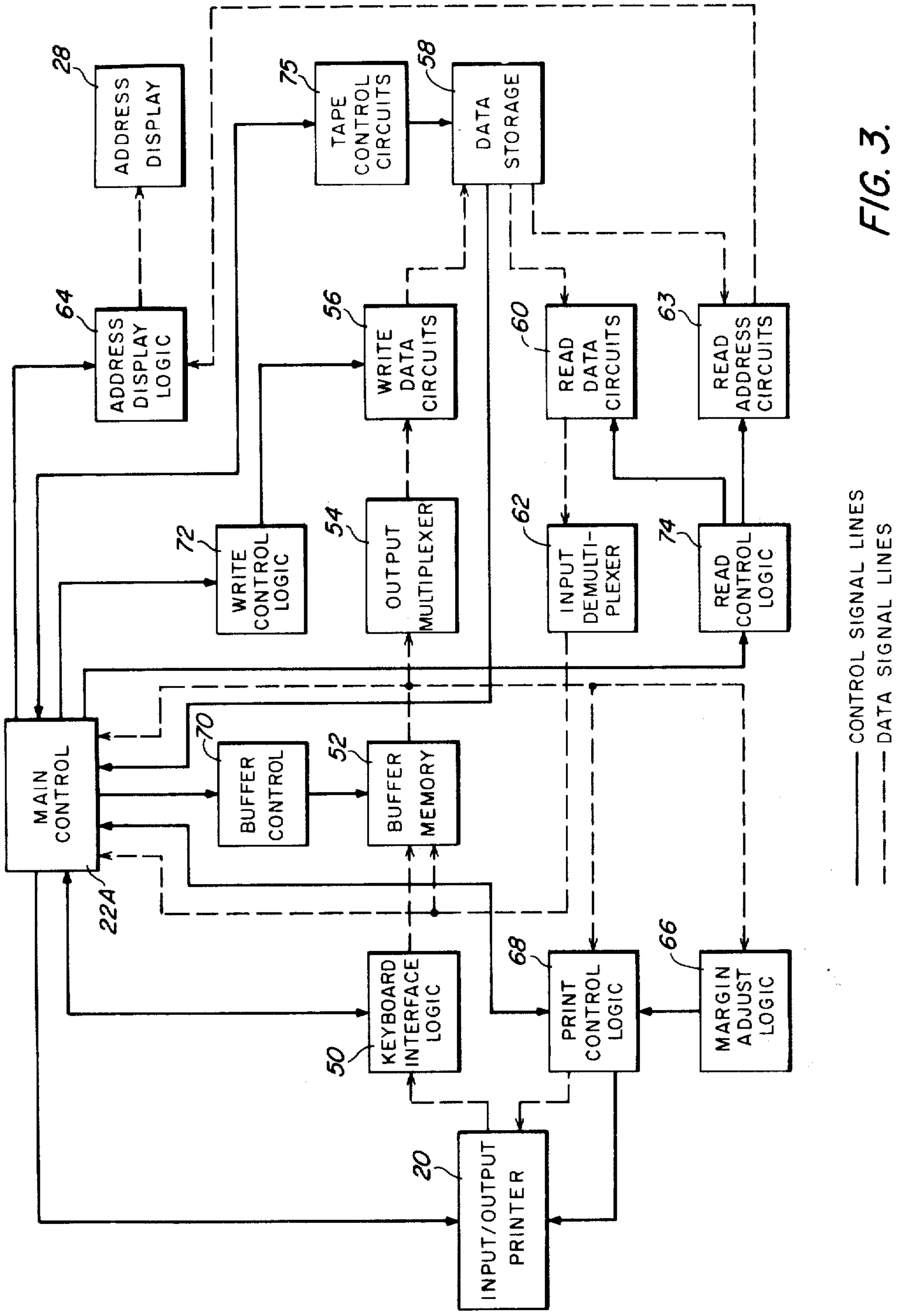
FIG. 3 is a block diagram illustrating the organization of the invention.

Before describing some of the more complex editing operations, it will be advantageous to describe briefly the general organization of the system embodying printer 20, baseplates 24 and control console unit 22. With reference particularly to FIG. 3, there is shown a block diagram of the organization of a system in simplified form. In order to clarify the diagram, all of the control connections are shown as solid lines whereas all of the data carrying lines are shown as dashed lines. The embodiment of FIG. 3 includes input/output printer 20 which, as previously described, is connected via base plate 24 to the control console. Data flow from the printer 20, in the form of electrical signals, is applied to keyboard interface logic 50. The latter primarily serves to encode electrical signals from the printer 20. The output of the interface logic 50 is then fed along an appropriate connection to the input of a buffer memory 52. As will be described later, the buffer memory 52 is preferably in the form of a shift register capable of storing, for example, 200 characters each of eight bits.

It will be appreciated that one may however employ a random access type memory such as a core array as memory 52, but because a random access memory might involve complex addressing logic, a shift register type of memory is preferred. The output of the buffer memory 52 in turn is connected to means such as a multiplexer 54 for converting the eight parallel bit per character format of the data organization in the buffer memory 52 to a serial train of data bits. The output of multiplexer 54 is then in turn fed to the input of write-data circuitry 56 which conditions the data and places it in single-channel format for storage, such as on the tape 18 in a cassette 240 mounted in a magnetic recording apparatus indicated as data storage 58.

Alternatively, if one employs an eight-track tape with corresponding read-write channels, data need not be multiplexed but can be read out directly from buffer storage to tape.

The organization shown in FIG. 3 also includes a return path for reading data out of data storage 58 so that it can be printed out by printer 20. To this end, data storage 58 is connected to read-data circuits 60 and to read-address circuits 63. The latter is intended to read the address track 29 on the two-channel tape 18 and provides an output which is connected to address-display logic 64 which serves to actuate address-display 28. Read-data circuits 60 are intended to read the data stored in serial form on the other track 25 of the tape 18. The output of read-data circuits 60 is fed to means, such as input demultiplexer 62, for converting the serial form of the data into an eight parallel bit per character code, suitable for injection into the buffer memory. To that end the output of demultiplexer 62 is coupled to the input of buffer memory 52. The output of buffer memory 52 is also connected as an input to both margin-adjust logic 66 and print-control logic 68. Margin-adjust logic 66 serves to examine the contents of buffer memory 52 so as to decide if, within a predetermined printing zone along the right hand margin of the carrier travel set on printer 20, a Hyphen, Space or Carrier Return code will occur, thereby providing the basis for a right hand margin adjustment system. Print-control logic 68 is primarily employed to control printer 20 in accordance with the character and functional signals received from the buffer memory and the signals received from margin-adjust logic 66. Additionally, print-control logic 68 is intended to decode the contents of buffer memory 52 into a form suitable for actuating printer 20.

Console unit 22 and the controls contained therein are shown as main control block 22A which is connected for controlling the operation of printer 20. Main control block 22A is interconnected with the keyboard interface logic for controlling the sum of the encoding functions of the latter and is also in turn connected to receive signals from the keyboard interface logic for use elsewhere in the system. Similarly, control block 22A is connected so as to view the data flowing both into buffer memory 52 and out of buffer memory 52. Print-control logic 68 includes preferably a parity check system whereby it examines data flowing out of buffer memory 52 for odd parity and provides a control signal to main control block 22A to indicate if parity is or is not correct. Buffer memory 52 is connected so as to be controlled by a buffer control system 70 which in turn is under the control of main control block 22A. The system also includes write-control logic 72 which is connected so as to be responsive to main control block 22A and is also coupled to control write-data circuits 56. Similarly, the system includes read-control logic 74 which is connected to be responsive to main control block 22A and serves to control both read-data circuits 60 and read-address circuits 63. The system also includes tape control circuits 75 which are responsive to main control block 22A and serve to control operation of mechanisms for transporting the data storage record or tape.

For convenience, the form of encoding employed in the system of the invention is based to a large extent upon the nature of the basic structure of a printer of the Palmer-type and a base plate of the Holmes-type. Thus, the print or informational characters can be defined in binary form according to the following Table I, wherein the eight data lines carrying each bit are respectively identified as R1, R2, R2A, R5, T1, T2, P (parity) and S (case), all collectively referred to hereafter as the data lines.

TABLE I

| BIT POSITION | 1 R1 | 2 R2 | 3 R2*a* | 4 R5 | 5 T1 | 6 T2 | PARITY | CASE |
|---|---|---|---|---|---|---|---|---|
| Character: | | | | | | | | |
| a | 0 | 0 | 1 | 1 | 1 | 0 | 0 | 0 |
| b | 0 | 0 | 0 | 0 | 0 | 1 | 0 | 0 |
| c | 0 | 0 | 1 | 1 | 0 | 1 | 0 | 0 |
| d | 1 | 0 | 1 | 1 | 0 | 1 | 1 | 0 |
| e | 1 | 0 | 1 | 0 | 0 | 1 | 0 | 0 |
| f | 0 | 1 | 1 | 1 | 0 | 0 | 0 | 0 |
| g | 1 | 1 | 1 | 1 | 0 | 0 | 1 | 0 |
| h | 1 | 0 | 0 | 0 | 0 | 1 | 1 | 0 |
| i | 0 | 0 | 1 | 0 | 1 | 0 | 1 | 0 |
| j | 1 | 1 | 1 | 0 | 0 | 0 | 0 | 0 |
| k | 0 | 0 | 1 | 0 | 0 | 1 | 1 | 0 |
| l | 1 | 0 | 0 | 1 | 0 | 1 | 0 | 0 |
| m | 1 | 1 | 1 | 1 | 1 | 0 | 0 | 0 |
| n | 0 | 1 | 1 | 0 | 0 | 1 | 0 | 0 |
| o | 1 | 0 | 0 | 1 | 1 | 0 | 0 | 0 |
| p | 1 | 0 | 1 | 0 | 0 | 0 | 1 | 0 |
| q | 0 | 0 | 1 | 0 | 0 | 0 | 0 | 0 |
| r | 1 | 0 | 1 | 1 | 1 | 0 | 1 | 0 |
| s | 1 | 0 | 0 | 0 | 1 | 0 | 1 | 0 |
| t | 1 | 1 | 1 | 0 | 0 | 1 | 1 | 0 |
| u | 0 | 1 | 1 | 1 | 0 | 1 | 1 | 0 |
| v | 0 | 1 | 1 | 1 | 1 | 0 | 1 | 0 |
| w | 0 | 0 | 0 | 0 | 1 | 0 | 0 | 0 |
| x | 1 | 1 | 1 | 1 | 0 | 1 | 0 | 0 |
| y | 1 | 0 | 0 | 0 | 0 | 0 | 0 | 0 |
| z | 1 | 1 | 1 | 0 | 1 | 1 | 0 | 0 |
| 1 | 1 | 1 | 1 | 1 | 1 | 1 | 1 | 0 |
| 2 | 0 | 1 | 1 | 0 | 1 | 1 | 1 | 0 |
| 3 | 0 | 1 | 1 | 1 | 1 | 1 | 0 | 0 |
| 4 | 1 | 0 | 0 | 1 | 1 | 1 | 1 | 0 |
| 5 | 1 | 0 | 1 | 0 | 1 | 1 | 1 | 0 |
| 6 | 0 | 0 | 1 | 0 | 1 | 1 | 0 | 0 |
| 7 | 1 | 0 | 1 | 1 | 1 | 1 | 0 | 0 |
| 8 | 0 | 0 | 1 | 1 | 1 | 1 | 1 | 0 |
| 9 | 0 | 0 | 0 | 0 | 1 | 1 | 1 | 0 |
| 0 | 1 | 0 | 0 | 0 | 1 | 1 | 0 | 0 |

TABLE I—Continued

| BIT POSITION | 1 R1 | 2 R2 | 3 R2a | 4 R5 | 5 T1 | 6 T2 | PARITY | CASE |
|---|---|---|---|---|---|---|---|---|
| ; | 1 | 0 | 1 | 1 | 0 | 0 | 0 | 0 |
| , | 0 | 0 | 1 | 1 | 0 | 0 | 1 | 0 |
| : | 0 | 1 | 1 | 0 | 1 | 0 | 0 | 0 |
| ' | 1 | 0 | 1 | 0 | 1 | 0 | 0 | 0 |
| / | 1 | 0 | 0 | 1 | 0 | 0 | 1 | 0 |
| = | 0 | 1 | 1 | 0 | 0 | 0 | 1 | 0 |
| + | 1 | 1 | 1 | 1 | 1 | 1 | 1 | 0 |
| Hyphen | 0 | 0 | 0 | 0 | 0 | 0 | 1 | 0 |

Upper case characters, of course, use a 1 bit in place of the case bit in each instance, and also for upper case characters the parity bit is the complement of the parity bit for the lower case character, in order to maintain odd parity. It will be appreciated that other encoding systems can be used, but the foregoing is the more convenient.

Figure 4:
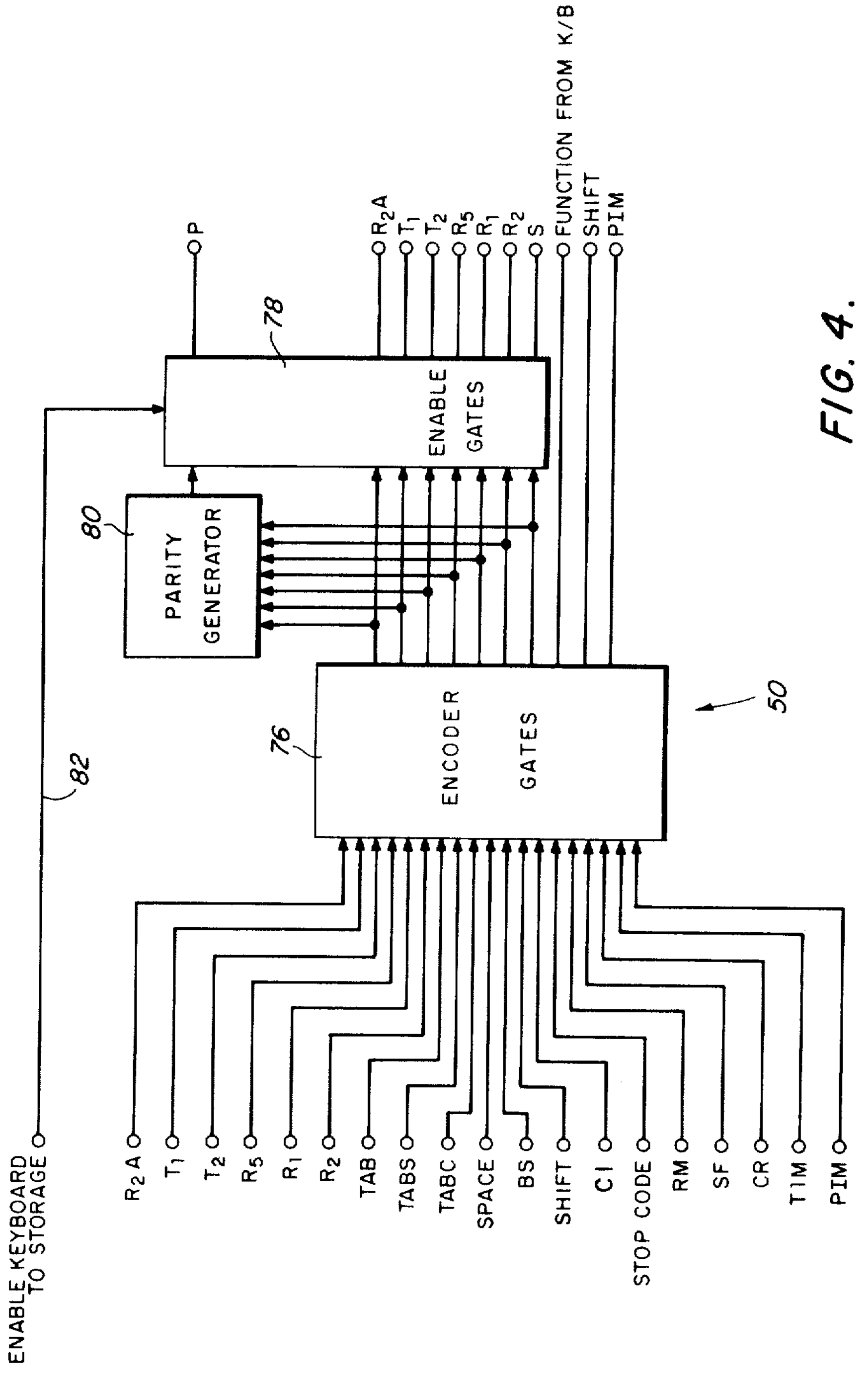
FIG. 4 is a block diagram showing details of the keyboard interface logic of FIG. 3.

As known, base plate 24 has six output data lines on which appear information character signals identified as R1, R2, R2*a*, R5, T1, and T2 (see FIG. 4). Each information character generated by the printer in response to operation of the keyboard is partially encoded in the form of combination of bits represented by these information character signals. These signals are direct outputs of the base plate.

Additionally, other signals representing operation of the functional keys of the printer are produced by the base plate as uncoded or simple signals. These signals are Tab (TAB), Tab Set (TABS), Tab Clear (TABC), Backspace (BS), Line Feed or Carrier Index (CI), Space (SP), Shift (SH), and Carrier Return (CR). Still another output obtained directly from baseplate 24 is a Printer-Head-in-Motion signal (PIM). All of the foregoing signals are fed as input signals to the keyboard interface logic 50 (FIGS. 3 and 4). In addition to the foregoing signals received directly from the baseplate, other simple signals may be supplied as inputs to the keyboard interface logic gate 50. Included are such signals as a Stop Code signal generated by depressing the shift key on the keyboard 23 of the printer and concurrently depressing Stop button 38 on the control console. The shift and stop signals produced are then gated in known manner to produce the Stop Code signal which is then encoded by keyboard interface logic 50 as shown in Table III.

Referring now to FIG. 4, the logic 50 includes an encoder which comprises a plurality of encoder gates 76 having input lines which carry the foregoing keyboard logic input signals. The keyboard interface logic 50 also includes a plurality of enable gates 78, a parity generator 80, and an enable line 82 connected to provide an enabling signal to enable input terminals of gates 78. Encoder gates 76 have data output lines connected to the input terminals of enable gates 78 and parity generator 80 has a plurality of input terminals connected to receive the signals being carried by the data output lines of encoder gates 76. The output of parity generator 80 is also connected as an input to enable gates 78.

To the extent shown in FIG. 4, the keyboard logic 50 performs a number of related functions. A basic function is to

TABLE II

| BIT POSITION | 1 R1 | 2 R2 | 3 R2a | 4 R5 | 5 T1 | 6 T2 | PARITY | CASE |
|---|---|---|---|---|---|---|---|---|
| Functions: | | | | | | | | |
| Tab Set | 0 | 1 | 0 | 0 | 0 | 0 | 0 | 0 |
| Tab Clear | 0 | 1 | 0 | 0 | 0 | 1 | 1 | 0 |
| Tab | 0 | 1 | 0 | 1 | 0 | 1 | 0 | 0 |
| Space | 0 | 1 | 0 | 1 | 1 | 1 | 1 | 0 |
| Backspace | 0 | 1 | 0 | 1 | 0 | 0 | 1 | 0 |
| Carrier Index | 1 | 1 | 0 | 1 | 0 | 1 | 1 | 0 |
| Carrier Return | 1 | 1 | 0 | 1 | 1 | 0 | 1 | 0 |

TABLE III

| BIT POSITION | 1 R1 | 2 R2 | 3 R2a | 4 R5 | 5 T1 | 6 T2 | PARITY | CASE |
|---|---|---|---|---|---|---|---|---|
| Functions: | | | | | | | | |
| Stop Code | 1 | 1 | 0 | 0 | 0 | 0 | 1 | 0 |
| Blank Cell | 0 | 0 | 0 | 0 | 0 | 0 | 0 | 0 |

complete the encoding of characters generated by operation of the keyboard so that each informational character is now coded as a unique combination of eight bits as earlier identified in Table I. This is accomplished by adding a parity bit and a case bit to the partial code produced by the informational character signals appearing on the six output data lines of the base plate. Another function is to encode as other unique combinations of eight bits, as identified in Table II, the various machine keyboard controlled functions that appear as direct base plate outputs — namely Tab, Tab Set, Tab Clear, Space, Backspace, Carrier Return and Carrier Index (i.e., Line Feed).

A third function is to encode as still other unique combinations of eight bits other logic inputs that do not arise directly or solely from that baseplate — namely, the Stop Code, and certain special or required functions. The preferred coding for the Stop Code is shown in Table III together with the coding for Blank Cell.

A fourth function is to provide three other outputs, an SH signal, a PIM signal and a signal identified, for convenience, as Function from Keyboard. This latter signal appears whenever any one of several signals indicative of keyboard function (specifically Tab, Tab Set, Tab Clear, Space, Backspace, Carrier Index and Carrier Return) appear at the inputs to encoder gates 76. These encoding functions are performed by encoder gates 76 and by parity generator 80, with the case (S), parity bit signal (P) and information character signals appearing as outputs of enable gates 78. Enable gates 78 produce outputs in response to signals appearing in the output data lines of encoder gates 76 and parity generator 80 only when an enable signal appears on enable line 82. Parity generator 80 is of a known type which generates a 1 bit along an output line to provide a parity signal P according to whether the parity of the signals appearing on its seven output lines is even or odd. The system herein disclosed uses odd parity so that a 1 bit is generated by parity generator 80 only when it determines that its input data signals have even parity. Parity signal P is passed to an appropriate output terminal of gates 78 when the latter are enabled.

Figure 5:
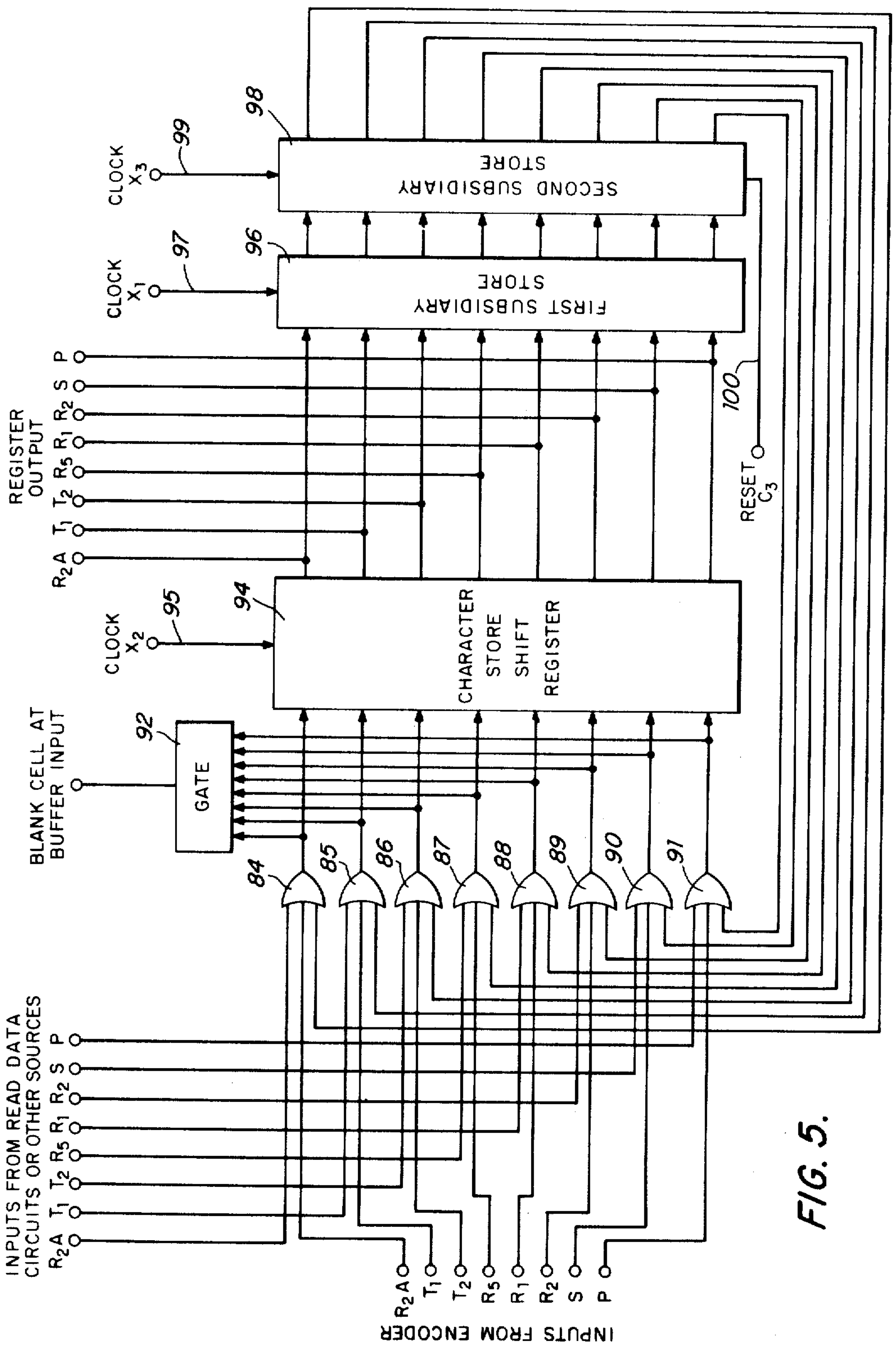
FIG. 5 is a block diagram showing details of the buffer memory of FIG. 3.

The encoder output shown in FIG. 4 from enable gates 78 and from encoder gates 76, as previously indicated in FIG. 3, are applied to buffer memory 52. The latter is shown in FIG. 5 as comprising eight input OR gates 84, 85, 86, 87, 88, 89, 90 and 91. The outputs from enable gates 78 are respectively connected to gates 84 through 91 inclusive. The latter are also connected to eight other input terminals, each identified by the corresponding code bit, to which are applied information character, case and parity signal inputs derived from the Read Data Circuits or other sources. The output from gates 84–91 inclusive are fed to a blank cell detector in the form of gate 92 which forms part of main control block 22A and are also fed in to the respective inputs of a main storage memory, preferably in the form of a static shift register 94 capable of storing 200 eight bit characters. Clock line 95 is provided for introducing a clocking signal $X_2$ for initiating storage or buffer shifting. The outputs of shift register 94, again eight lines which correspond to the inputs from enable gates 78 are connected to corresponding output terminals each identified by the appropriate corresponding code in the drawing. The eight output lines are also connected to the corresponding inputs of a first subsidiary storage register or device 96 which is preferably an eight-bit single character register having an input clock line 97 at which clocking signal $X_1$ is intended to be applied. First subsidiary storage device 96 has eight output lines, each corresponding of course to one of the eight input lines thereto and each connected to a corresponding input of a second eight-bit single character register 98 which is clocked by a signal $X_3$ over line 99 and can be cleared by a reset-signal $C_3$ over a line 100. Register 98 again has eight output lines each corresponding to a respective input line to the register, the output lines from register 98 each being connected to a corresponding one of input gates 84–91 inclusive so that, for example, gate 91 which has an input connected to the parity bit line from parity generator 80 also has an input connected to the corresponding parity bit line from register 98. Similarly, all of the other input lines to the various OR gates 84–91 are matched. The path thus defined from the respective input OR gates through the main buffer storage register 94, through registers 96 and 98 and back to the input OR gate, will be seen to constitute a complete feed back path around the main register 94. In the embodiment shown, two subsidiary storage registers 96 and 98 are employed to minimize problems arising from possible differences in the operating speed of the main and subsidiary storages. However, the feedback loop may comprise but one single-character register if the latter is closely matched in terms of operating speed to the main register 94.

It is now important for an understanding of the invention to appreciate how data is passed through the buffer memory during the various operating modes heretofore described.

As previously noted, the main store is static shift register. Assuming that it is an eight-line 200 bit register 94, i.e., can store 200 eight bit characters, each time a clocking signal $X_2$ is applied over line 95, a new character will be entered at the left hand end of the register via gates 84–91 and whatever characters are already stored in the register will shift one cell, i.e., one bit position to the right. If a character is already stored in the 200th cell, it will be ejected from the right hand of the cell when the register shifts in response to an $X_2$ clocking signal. The subsidiary stores also are static shift registers 96 and 98. Accordingly, occurrence of a clocking signal $X_1$ on line 97 will cause the first subsidiary storage register 96 to respond to and store the data signals that appear on the output lines of register 94. Occurrence of a clocking signal $X_3$ on line 99 will cause the second subsidiary storage register 98 to respond to and store the data signals appearing on the output lines of the first subsidiary storage register 96. Occurrence of a $C_3$ reset pulse on clear line 100 clears the second subsidiary storage register 98 to prevent a character previously stored therein from being circulated back to the register 94 via OR gates 84–91. Clearing the second subsidiary storage register 98 is performed when it is desired to clear the main register or to enter new data into the main register.

The clocking pulses for the buffer memory are derived from a four-phase clock pulse generator. As described hereinafter, the clock generator is gated to provide a series of four clock pulses or tetrads occurring at times $\Phi_1$, $\Phi_2$, $\Phi_3$, $\Phi_4$. The generator also is adapted to generate such tetrads as in four different clusters or groups characterized by a quantifier depending upon the operating mode of the system. The clock pulse generator is gated to provide a train of clock pulses each time a printer key is depressed or the printer prints a character or executes a function in response to an output from the buffer memory 52 or each time the system is caused to delete or skip a character as a result of depressing one of the delete/skip buttons 45, 39 and 40. The reason for slaving the clock pulse generator (and thus the buffer memory) to the printer when the system is set so that the typewriter will print out in accordance with the output from the buffer memory, is that the printer takes longer to execute some operations than others. Similar reasoning is the basis for adapting the clock pulse generator to generate pulse groups according to one of four different quantifiers depending upon the operating mode of the system. As will be seen, the quantifiers in the preferred embodiment are 1, 199, 200 and 201.

As hereinafter described, provision is made for clocking the buffer memory so that it can be made to undergo a single shift cycle or a 201 shift cycle (assuming a 200 character main buffer memory). In the single shift cycle the main register 94 is shifted as a result of an $X_2$ clocking signal. In the 201 shift cycle, the second subsidiary register 98 is held clear during the main store shift to prevent circulation of old data from the second subsidiary register 98 back to the main register 94. When typing in a character from the keyboard in the Draft mode, there is no need to clock the subsidiary registers in order to effect a single shift whereby the typed character is entered into the left hand end of the main register 94; in practice however, all three registers 94, 96 and 98 are clocked according to a "$X_1X_3X_2$" sequence (i.e., clocking signals $X_1$, $X_3$, and $X_2$ occur in the order named at times $\Phi_1$, $\Phi_2$, and $\Phi_3$ respectively). In a 201 shift cycle, the main register 94 is shifted 201 times, with all three registers 94, 96 and 98 being clocked according to the normal sequence "$X_1X_3X_2$", or a second special "$X_1X_2X_3$" sequence. In this latter sequence, the clocking signals $X_1$, $X_2$, and $X_3$ occur in the order named at times $\Phi_1$, $\Phi_2$, and $\Phi_3$ respectively. Provision is also made for clocking the buffer memory so that it can undergo a 199 or 200 shift cycle (again assuming a 200 character main store). The 199 shift cycle is used to shift the contents of the main storage register to the left (backward) one cell while the 200 shift cycle is used to clear the main register and for other actions.

A large number of buffer memory clocking modes are employed in operation of the system. Some of these modes are described as follows:

Typing data into store in the Draft Mode: In this case a single or a 201 shift cycle is used, with the clocking occurring in the $X_1X_3X_2$ sequence and the second subsidiary storage 98 being held clear during the single shift cycle and during the first of the 201 shifts to prevent circulation of old data and to enable a new character to be entered into the main register 94. No reset signal is applied to clear line 100 during the remaining 200 shifts so that the contents of the main register 94 can be circulated and so that the new character sits at the left hand end of the main register 94 just as if a single shift cycle had been executed. The advantage of using the 201 shift cycle rather than the single shift cycle for this purpose is because the 201 shift cycle permits one to examine the buffer contents to detect a full buffer condition.

Printing out from the buffer memory: Single shifts are used in this mode, with the $X_1X_3X_2$ sequence providing normal circulation of data through the main and subsidiary storage registers 94, 96 and 98. Data signals from the typewriter sensors in the base plate 24 during the time that the typewriter is printing out are prevented from appearing on the input lines to OR gates 84–91.

Inserting data into store in the insert mode: This mode can be utilized when the machine has been set for Insert mode operation. It involves a 201 shift cycle. The clocking order is initially $X_1X_2X_3$, but is caused to revert to $X_1X_3X_2$ at a point in the 201 shift cycle when a blank cell is detected at a selected point in the buffer memory. Two variations are provided. In one case the clocking order will change to $X_1X_3X_2$ when a blank cell is first seen at the output of the second subsidiary register 98 (i.e., at the input of the main register 94) in $\Phi_4$ time, i.e., immediately after completion of an $X_1X_2X_3$ clocking sequence. The second variation is when the system includes an insert overflow feature to be described hereinafter. If 199 cells of the available 200 in the main buffer register 94 are filled with stored characters, a potential insert overflow situation arises. Accordingly, any further insertions are made with the buffer memory 52 clocking order reverting to the $X_1X_3X_2$ sequence, when a blank cell is detected at the output of the main storage register 94 immediately after completion of an $X_1X_2X_3$ clocking sequence. A second blank cell detector, similar to gate 92, is connected to the output lines of the main storage register 94.

Delete Mode: This mode can be utilized only when the machine has been set for Draft Mode Operation. Deletion of a character is accomplished by a 201 shift cycle, initially in the normal $X_1X_3X_2$ clocking sequence but switching to the $X_1X_2X_3$ sequence when a blank cell is first detected at the output of the second subsidiary register 98 in $\Phi_4$ time. Deletion of a group of characters is achieved by repetitive cycles of 201 shifts.

Skip Mode: This mode can be used only when the system has been set for Final Mode operation. It involves single shifts with the $X_1X_3X_2$ clocking sequence. The behavior of the system is the same as when printing out from the buffer memory, except that the printer 20 is prevented from typing out the skipped character.

Clearing Buffer: This mode involves a 200 shift cycle and may be conducted according to either clocking sequence. Preferably, however, it is conducted with the $X_1X_3X_2$ clocking sequence.

Examining the Buffer Memory Contents for Any Purpose: This mode involves a 200 shift cycle and may be conducted in the $X_1X_3X_2$ clocking sequence.

The effect of the clocking sequence on the buffer memory will now be described. In the normal $X_1X_3X_2$ clocking sequence, the first subsidiary store 96 is clocked first ($\Phi_1$ time) to register the data signals appearing at the output of the main register 94, i.e., it assumes the state of the last cell of the main register 94. Then the second subsidiary register 98 is clocked ($\phi_2$ time) so that it will assume the state of the first subsidiary register 96. When this occurs the second subsidiary register 98 will have steady state output signals indicative of its new state and these output signals appear at the inputs of OR gates 84–91. Next the main register 94 is clocked ($\Phi_3$ time) so that its contents will undergo a single shift to the right (forward) and its first cell will assume the state of the signals appearing at the input terminals of OR gates 84–91. However, if a $C_3$ reset signal is applied to clear line 100 at the time that the second subsidiary register 98 is clocked (or afterward) and before the main register 94 is clocked, the first cell of the main register will assume a clear state when the main register is clocked by the $X_2$ clock pulse. If however OR gates 84–91 have inputs from the keyboard 23 or other sources, then when clocked by the $X_2$ clock pulse the first cell assumes a state determined by such inputs. This procedure of using an $X_1X_3X_2$ clocking sequence accompanied by a $C_3$ reset signal is called the "non-circulate mode" and is used when entering characters from the keyboard 23. The procedure of using the $X_1X_3X_2$ clocking sequence without a $C_3$ reset signal is called the "normal circulate mode" and is used when it is desired merely to circulate data from one end to the other of the main register 94.

In the $X_1X_2X_3$ sequence, the first subsidiary register 96 again assumes the state of the last cell in the main register 94 when the $X_1$ clock pulse occurs. Then the main store is clocked to execute a single step shift. When this occurs the first cell of the main register 94 assumes the state of the second subsidiary register 98. Next the second subsidiary register 98 is clocked to store the signals appearing at the output of the first subsidiary register 96. As just described, this $X_1X_2X_3$ clocking sequence permits circulation of data from one end to the other of the main storage register 94. If a $C_3$ reset signal is applied to the second subsidiary register 98 before the main store is clocked ($\Phi_2$ time), the first cell of the main store register 94 will not be able to assume the state of the second subsidiary register 98 when it shifts, and thus will be blank or will assume a state determined by whatever other signals are present at the inputs of OR gates 84–91. However, when the second subsidiary register 98 is clocked at $\Phi_3$ time, it will assume the state of the first subsidiary register 96. This procedure of using an $X_1X_2X_3$ clocking sequence is called the "enhanced circulation mode" since its net result is to increase the buffer memory capacity by one character. More explicitly, it permits circulation of a group of stored characters without loss while permitting a new character to be inserted into that group. Essentially this enhanced circulation mode delays transfer of a character from the output of the main register 94 back to the input of the main register 94 so as to permit a character to be inserted from the keyboard 23 during an insert cycle. In other words, it serves to increase temporarily the effective size of the main register 94 by a single character. It also permits a character to be deleted during a delete cycle, as explained hereinafter.

Figure 6:
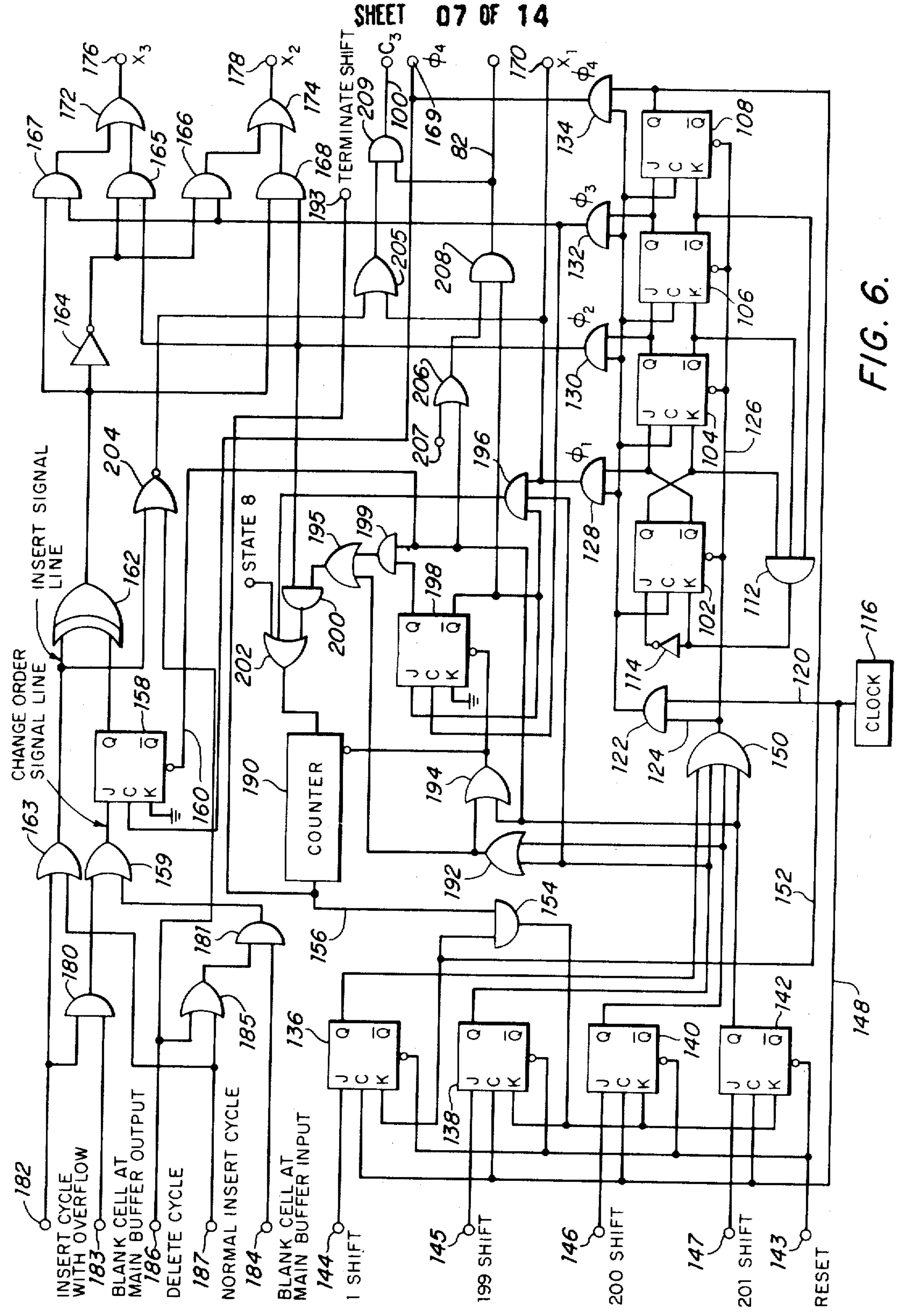
FIG. 6 is a logic diagram partly in block form illustrating a clocking control system forming part of the buffer control of FIG. 3.

FIG. 6 illustrates the four-phase clock generator and the associated logic circuit for changing the clocking order. FIG. 6 and other logic diagrams hereinafter will be described in terms of positive logic for clarity in exposition, but it is to be understood that negative logic can also be used. Essentially the four phase clock generator is a self-correcting twisted ring counter comprising four JK master-slave flip-flops 102, 104, 106 and 108 interconnected so that the Q and $\bar{Q}$ output terminals of flip-flop 102 are connected to the K and J terminals of flip-flop 104, while the Q and $\bar{Q}$ terminals of flip-flop 104 are connected to the J and K terminals of flip-flop 106 and the Q and $\bar{Q}$ terminals of the latter are connected to the J and K terminals of flip-flop 108. The Q terminal of flip-flop 102 and the $\bar{Q}$ terminals of flip-flops 104 and 106 are connected to the input terminal of AND gate 112 whose output terminal is coupled directly to the K terminal of flip-flop 102 and also to the input of inverter 114. The output of inverter 114 is applied to the J terminal of flip-flop 102. The generator also includes clock 116 whose output is applied, e.g., at 455 KHz, on line 120 to one input terminal of AND gate 122. The latter is enabled by an enable generator signal that is applied to gate 122 on line 124. This enable generator signal also is applied on line 126 to the clear terminals of flip-flops 102 to 108 inclusive. The output terminal of AND gate 122 is connected to the clocking input terminal C of all four flip-flops 102 to 108 inclusive. As hereinafter described, the four flip-flops operate sequentially to produce corresponding output clock signals denoted $\Phi_1$, $\Phi_2$, $\Phi_3$ and $\Phi_4$. These latter signals are derived from the Q terminal of flip-flop 102 and the respective Q terminal of each of flip-flops 104, 106 and 108 and are applied to the input terminals of four AND gates 128, 130, 132 and 134. These latter gates have second input terminals that are each connected to the output terminal of AND gate 122. The Q terminal of flip-flop 108 is connected, as will be shown later, to control the duration of the enable generator signal so that the four phase clock generator can operate for 1, 199, 200 or 201 cycles of tetrads as required.

Typically, the clock signals from clock 116 and enable generator signals on line 124 are positive pulses. The leading edge of the enable generator signal is immediately preceded by the trailing edge of a clock pulse.

Assume for purposes of discussion that gate 122 is enabled with an enable generator signal so that the gate will pass clock pulses from clock 116. The enable generator signal appearing also on line 126 will enable the four flip-flops 102 to 108 to be clocked. As a consequence, the output of gate 112 will initially be low, so that the J and K terminals of flip-flop 102 will be high and low respectively. At the same time the J and K terminals of flip-flop 104 will be high and low respectively while the J and K terminals of each of flip-flops 106 and 108 will be low and high respectively. The first flip-flop clocking pulse produced by gate 122 will cause the Q and $\bar{Q}$ terminals of flip-flops 102 and 104 to go high and low respectively but will not cause any change in the signal level appearing at the $\bar{Q}$ terminals of flip-flops 106 and 108. The second or next flip-flop clocking pulse will cause the $\bar{Q}$ terminals of flip-flops 104 and 106 to go high and low respectively but will not cause any change in the signal level appearing at the Q and $\bar{Q}$ terminals of flip-flops 102 and 108 respectively. On the third flip-flop clocking pulse, the $\bar{Q}$ terminals of flip-flops 106 and 108 will become high and low respectively while no change in signal level will occur at the Q and $\bar{Q}$ terminals of flip-flops 102 and 104. The fourth flip-flop clocking pulse will cause the signals appearing at the Q and $\bar{Q}$ terminals of flip-flops 102 and 108 to go low and high respectively, while the signal levels at the Q terminal of flip-flops 104 and 106 remain unchanged. At this point the four flip-flops are in the same state as when held clear by the absence of the enable generator signal appearing on line 126. A fifth flip-flop clocking pulse will cause the signals appearing at the Q and Q of flip-flops 102 and 104 to change as on the first clocking pulse, while leaving the output at the Q terminals of flip-flops 106 and 108 unchanged. At the end of this fifth clocking pulse, the four flip-flops have the same states as after the first clock pulse. The next three flip-flop clocking pulses will cause the flip-flops to assume successively the same states produced by the second, third and fourth clocking pulses. This mode will continue to be repeated so long as clocking pulses are applied to the four flip-flops.

As previously noted, the clock signal from gate 122 is applied to gates 128 to 134 inclusive. The timing arrangement is such that (*a*) when the first clock signal arrives at gates 128 to 134, the $\bar{Q}$ terminal of flip-flop 102 is high and the Q terminals of flip-flops 104, 106 and 108 are low, with the result that only gate 128 produces an output pulse; (*b*) when the next clock signal arrives at gates 128 to 134, the $\bar{Q}$ terminal of flip-flop 102 and the Q terminals of flip-flops 106 and 108 are low and the Q terminal of flip-flop 102 is high so that only gate 130 produces an output pulse; (*c*) on the third clock signal, the Q terminal of flip-flop 106 is high and the $\bar{Q}$ terminal of flip-flop 102 and the Q terminals of flip-flops 104 and 108 are low, so that only gate 132 produces an output pulse; (*d*) on the fourth clock signal, the $\overline{Q}$ terminal of flip-flop 102 and the Q terminal of flip-flops 102 and 106 are low while the Q terminal of flip-flop 108 is high, so that only gate 134 produces an output signal; and (*e*) on the fifth clock signal the $\overline{Q}$ terminal of flip-flop 102 is high and the Q terminals of flip-flops 104, 106 and 108 are low so that only gate 128 produces an output signal. The next three pulses will cause gates 130, 132 and 134 to pass pulses sequentially as occurred on the second, third and fourth clock pulses. Essentially flip-flops 102 to 108 inclusive act as a commutator so that pulses are passed sequentially by gates 128 to 134 inclusive repetitively as long as these gates are enabled and clock 116 operates. The sequential outputs from gates 128, 130 132 and 134 identified as $\Phi_1$, $\Phi_2$, $\Phi_3$ and $\Phi_4$ respectively obviously will occur at the same repetition rate as the clock pulses. Resetting of the flip-flops by the absence of an enable generator signal on line 126 assures that the flip-flops will always be in the correct state when the clock generator is required to produce one or more tetrads of $\Phi_1 - \Phi_4$ clocking pulses.

The enable generator signal is provided by another portion of the circuit shown in FIG. 6. This latter portion of the circuit comprises four JK flip-flops 136, 138, 140 and 142 whose reset terminals are all connected to input terminal 143 at which a negative reset signal is applied when the machine is turned on. Each J terminal of flip-flops 136 to 142 is connected to a respective corresponding input terminal 144, 145, 146 and 147 at which are applied different signals identified as "1 shift," "199 Shift," "200 Shift," and "201 Shift" respectively. The C or clocking terminals of all four flip-flops are connected by common line 148 to the output of clock 116. The Q terminals of all of flip-flops 136, 138, 140 and 142 are connected to separate input terminals of OR gate 150 whose output is connected by line 124 to input AND gate 122 of the 4-phase clock generator. The K terminal of flip-flop 136 is connected by line 152 from the Q terminal of of the fourth flip-flop 108 of the 4-phase clock generator, and is also connected to one input terminal of AND gate 154. The latter has a second input terminal to which is applied, by line 156, a Terminate Shift signal or pulse derived from counter 190 of the circuit hereinafter described for counting the number of times the buffer shifts or is clocked. The output of AND gate 154 is applied to the K terminals of flip-flops 138, 140 and 142.

Operation of the above described circuit for controlling the clock generator control signal will now be described. The "1 Shift," "199 Shift," "200 Shift," and "201 Shift" signals are positive pulses which are respectively and selectively applied to the corresponding J input of flip-flops 136, 138, 140 and 142 coincidentally with a clock pulse on line 148. The four flip-flops 136 to 142 are cleared by the reset signal at terminal 143 and are clocked by the pulses on line 148. In the cleared condition the Q terminals of the four flip-flops are all low. Assuming that one of the flip-flops has a shift signal applied to its J terminal, when a clock pulse is applied on common line 148 the flip-flop will change states so that its Q terminal goes high. Because of other logic in the system only one shift signal can be present at any one time. Thus only one flip-flop can change state when a clock pulse occurs. For example, if the "1 Shift" signal is present, the Q terminal of flip-flop 136 will go high and the corresponding Q terminals of the other three flip-flops will remain low. Assuming for purposes of discussion that the "199 Shift" signal is applied at terminal 145, OR gate 150 will have one high and three low inputs; accordingly its output will be a generator enable signal which will cause the clock generator to produce tetrads of $\Phi_1 - \Phi_4$ timing pulses as above described. The generator enable signal will continue until coincidence of the terminate shift signal on line 156 and of the input signal on line 152 applied through gate 154 cause the K terminal of flip-flop 138 to go high whereupon the Q terminal of that flip-flop will go low on the next clock pulse on line 148. With all four inputs to gate 150 then low, the latter will now produce a low output, thus terminating the enable generator pulse on line 126.

Similarly, it will be seen that the application of any of the shift signals to its corresponding flip-flop will initiate a generator enable signal at the output of gate 150, and that the 4-phase generator will continue to run until the generator enable signal terminates due to coincidence of signals on lines 152 and 156.

FIG. 6 also includes the logic for changing the clocking order of the buffer memory, which logic comprises JK flip-flop 158 whose J terminal is connected to the output of OR gate 159 from which is provided a Change Order signal hereinafter described. The C or clocking terminal of flip-flop 158 is connected to the output terminal of gate 134. The reset terminal of flip-flop 158 is connected to a line 160 on which may be applied a reset signal from the Q output terminal of flip-flop 142. The Q terminal of flip-flop 158 is connected to one input terminal of an exclusive OR gate 162. Gate 162 has a second input terminal which is connected to the output of OR gate 163 which provides an Insert signal derived as hereinafter described. The output terminal of gate 162 is connected through inverter 164 to input terminals of two AND gates 165 and 166. The output terminal of gate 162 is also connected to input terminals of two more AND gates 167 and 168. A second input terminals of each of gates 165 and 168 are connected to the output terminal of gate 130, while the second input terminals of each of gates 166 and 167 are connected to the output terminal of gate 132. The output terminals of gates 134 and 128 are simply connected respectively to output line 169 and terminal 170. The output terminals of gates 165 and 167 are connected to respective input terminals of OR gate 172 and the output terminals of gates 166 and 168 are connected to different input terminals of OR gate 174. The output terminals of gates 172 and 174 are connected to output lines 176 and 178 respectively.

Gate 163 has a pair of input terminals respectively connected to terminal 132 and 137 to which are applied respectively an Overflow Insert Cycle signal and a Normal Insert Cycle signal.

Gate 159 has a pair of inputs respectively connected to the outputs of AND gates 180 and 181. AND gate 180 has a pair of inputs connected to terminals 182 and 183. Terminal 183 is intended to have applied thereto a Blank Cell Detected at Main Buffer Output signal. The latter signal typically is derived from gating which is preferably connected to the output of main register 94 of FIG. 5. AND gate 181 has a pair of input terminals one of which is connected to input terminal 184 at which may appear a Blank Cell at Buffer Input signal from gate 92 shown in FIG. 5. The other input terminal of AND gate 181 is connected to the output of OR gate 185 which also has two input terminals 186 and 187.

Terminal 186 has applied thereto respectively a Delete Cycle Signal.

Operation of the logic circuit for changing the clocking order of the buffer memory will now be described. The Change Order signal applied to the J terminal of flip-flop 158 will occur by operation of gates 159, 180, 181 and 185 whenever (1) a blank cell is detected at the output of the second subsidiary storage register 98 of the buffer memory and the machine is ordered to insert a character into the buffer memory without an overflow, or to delete a character, or (2) a blank cell is detected at the output of the main storage register 94 and the machine is ordered to insert with overflow a character into the buffer. The Insert signal applied to one of the inputs of exclusive OR gate 162 will occur, by operation of OR gate 163 whenever the machine is ordered to insert a character into the buffer memory, with or without overflow. According to the logical operation of gate 162, the latter will provide a high output when either input signal is high but not when both input signals are simultaneously high or simultaneously low.

Flip-flop 158 is clocked by the $\Phi_4$ output signal from gate 134. If a Change Order Signal is present on the J terminal of flip-flop 158 when the $\Phi_4$ signal occurs, the Q terminal of that flip-flop will go high. If a high Insert signal from gate 163 is applied to gate 162, the latter will provide an output signal only when the Q terminal of flip-flop 158 is low. As noted, a Change Order signal can occur only during an Insert Cycle or a Delete cycle in accordance with the buffer memory Insert and Delete Clocking modes previously described.

If the output of gate 162 is high, it enables AND gates 167 and 168; if it is low, it enables AND gates 165 and 166. Accordingly, if for example it is $\Phi_2$ time and the output of gate 162 is high, gate 168 will pass the $\Phi_2$ signal to OR gate 174. Since at that time both inputs of AND gate 166 are low, the other input to OR gate 174 will be low, the $\Phi_2$ signal will appear on line 178. At the same time the output of gates 167 and 165 will also be low because $\Phi_3$ is a low input to gate 167 and the output of inverter 164 is a low input to gate 165. Accordingly, the output of OR gate 172 will also be low. If now the output of gate 162 goes low, the $\Phi_2$ signal will appear instead at the output of OR gate 172 and the other OR gate 174 will have a logical zero at its output. It is to be noted that lines 170, 178, 176, 169 are connected to terminals identified as $X_1$, $X_2$, $X_3$, and $\Phi_4$. The signals appearing at terminals $X_1$, $X_2$, and $X_3$ are the clocking signals for the buffer memory. Hence the buffer will be clocked in the $X_1X_3X_2$ mode if the output of gate 162 is low and in the $X_1X_2X_3$ mode if the output of gate 162 is high. That is, the $\Phi_2$ and $\Phi_3$ signals appear at the $X_3$ and $X_2$ terminals only when both the Insert signals and Change Order signal are either present together or absent together, and the $\Phi_2$ and $\Phi_3$ signals appear respectively at the $X_2$ and $X_3$ terminals only when one of the Insert and Change Order signals is present and the other absent. In essence, the gating scheme of gates 162, 165, 166, 167, 168, 172 and 174 together with inverter 164 is the equivalent of a double-pole, double-throw switch automatically actuated by a set of circumstances.

The circuit of FIG. 6 includes means for counting the number of times the buffer is clocked, and to this end the circuit of FIG. 6 includes a counter 190 for generating an output signal after counting 200 pulses, and input logic for adding or deleting a pulse as will be hereinafter explained. The logic here includes OR gate 192 having a pair of input terminals connected to the Q terminals of flip-flops 138 and 140. The output of gate 192 is connected to an input of OR gate 194 and also to an input of OR gate 195. The Q terminal of flip-flop 142 is connected to the other input of OR gate 194. A three-input AND gate 196 has two of its inputs connected respectively to the output of gate 128 and the Q terminal of flip-flop 138. Another J-K flip-flop 198 is provided, having its J and $\overline{Q}$ terminals tied together and connected to the third input of AND gate 196. Flip-flop 198 has its clock terminal connected to the output of gate 132 so as to be clocked by the $\Phi_3$ pulses from the latter. The clear terminal of flip-flop 198 is connected to the output of gate 194.

The Q terminal of flip-flop 198 and the Q terminal of flip-flop 142 are connected as inputs to AND gate 199. The output of gate 199 is connected as an input to gate 195. The output of gate 195 and the output of gate 130 are connected as inputs to AND gate 200. The outputs of AND gate 200 and of AND gate 196 are connected as inputs to OR gate 202 and the output of the latter is connected as the count input to counter 190. Counter 190 is preferably any of a large number of digital counters well known in the art having a clear terminal at which application of a low signal will reset or clear the counter to its initial state, and, in a preferred embodiment will provide an output signal when it has counted 200 input pulses. The clear terminal of counter 190 is connected also to the output of gate 194. The output terminal of counter 190 is connected as the terminate shift line input to gate 154 and to terminate shift terminal 193.

In operation, it will be seen that when the signal from gate 194 goes high, it serves to enable both flip-flop 198 and counter 190 so that both can be clocked. This will occur when according to gates 192 and 194 any of the 199 shift, 200 shift or 201 shift signals are applied to the J terminals of flip-flops 138, 140 and 142 respectively. Counter 190 will count $\Phi_2$ pulses passed by gates 200 and 202 when gate 200 is enabled. Gate 200 is enabled immediately if the Q terminal of either of flip-flops 138 and 140 goes high. However, gate 196 when enabled provides an alternative pulse source, being connected to gate 128 which provides $\Phi_1$ pulses. This enablement only occurs when flip-flop 198 is off, i.e. its $\overline{Q}$ terminal is high and when the 199 shift signal has turned flip-flop 138 on, i.e., its Q terminal is high. But, if the $\overline{Q}$ terminal of flip-flop 198 is high because it is connected to the J terminal when a $\Phi_3$ clock pulse clocks flip-flop 198, the latter turns on and its $\overline{Q}$ terminal goes low. This operation thus provides a single pulse to counter 190 prior to any counting of $\Phi_2$ pulses by the latter. Because gate 200 is enabled by the output of flip-flop 138 counter 190 will then count $\Phi_2$ pulses. When the counter has counted a single $\Phi_1$ pulse and 199 $\Phi_2$ pulses, it yields a terminate shift signal on line 156. Effectively then it has counted only 199 shifts in the buffer.

When the Q terminal of flip-flop 142 goes high due to the 201 shift signal, flip-flop 158, flip-flop 198 and counter 190 are enabled and the first $\Phi_2$ pulse is not counted by counter 190 because gate 200 is disabled by the absence of a high signal at the output of gate 195. However the first $\Phi_3$ pulse clocks flip-flop 198 so that its Q terminal goes high, gate 199 is enabled and gate 195 passes the signal from gate 195 to enable gate 200. Counter 190 then counts the next 200 $\Phi_2$ pulses and yields the output signal on line 156. Effectively however, because it was forced to skip counting an initial $\Phi_2$ pulse, the counter 190 has counted through 201 shifts of the buffer.

Obviously when flip-flop 140 is triggered, counter 190 will simply count up to the full 200 shifts and then will provide a Terminate Shift signal on line 156 to gate 154.

A Carrier Return signal provided from the baseplate 24 will ordinarily cause the buffer memory to empty into magnetic storage through repetitive one-shift cycles as heretofore noted. The emptying process for a completely full 200 character buffer memory requires about the amount of time needed for the print head 16 on the printer 20 to return from a typical right margin position to a typical left margin position. However, if the data stored in the buffer is only a portion of a line, the print head 16 would be expected to return to its left margin position well before the entire buffer memory could be emptied of meaningful and blank or empty characters. Hence, the invention includes means for making the buffer memory available for input thereto of new data immediately after the meaningful data has been transferred out.

Figure 7:
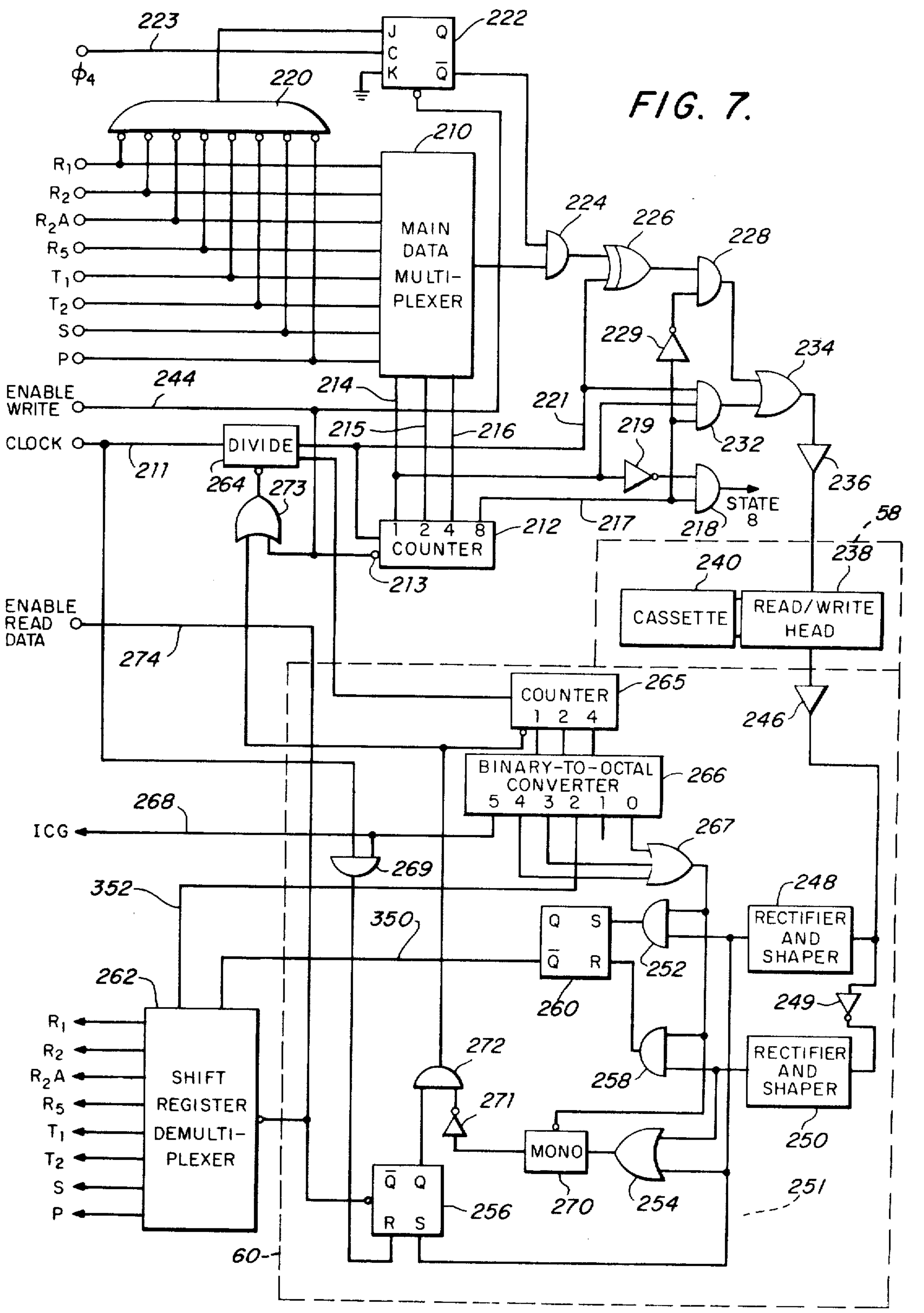
FIG. 7 is a logic diagram partly in block form illustrating output multiplex, input demultiplex and read and write circuits shown in FIG. 3.

Thus, as shown in FIG. 7 the invention includes means for transferring the contents of the buffer memory into magnetic storage and for releasing the buffer memory for further entry therein immediately following transfer of the meaningful contents into magnetic storage. The foregoing means preferably comprises multiplexer 210 (shown earlier at block 54 in FIG. 3) having a plurality of parallel inputs respectively connected to the eight output lines of shift register 94 (FIG. 5). Multiplexer 210 is an eight-input channel digital multiplexer well known in the art for coverting eight parallel input bits to a serial chain on a single output channel.

Lastly, the remainder of FIG. 6 includes logic for generating the $C_3$ signal which is to be applied to line 100 (FIG. 5) and also for generating the Enable Keyboard to Storage signal which is to be applied to line 82 (FIG. 4). To this end, the circuit of FIG. 6 includes NOR gate 204 having one input connected to the output from OR gate 163, and another input connected to terminal 186. The output of NOR gate 204 is connected as one input to OR gate 205. Another input to OR gate 205 is connected to the output of gate 128.

Yet another OR gate 206 is provided, having one input connected to the Q output terminal of flip-flop 142 and another input connected to terminal 207. The output of OR gate 206 is connected to the one input of AND gate 208. A second input to AND gate 208 is connected to the Q terminal of flip-flop 198. The output of AND gate 208 is shown connected to line 82, inasmuch as the signal from gate 208 is the desired Enable Keyboard to Storage signal. The output of gate 205 and line 82 are also connected as respective inputs to AND gate 209. The output of the latter is shown as line 100 along which the requisite $C_3$ signal can be provided.

Gates 209 and 205 define the length of the $C_3$ pulse. As indicated, a relatively long $C_3$ pulse is used when overwriting a character in the buffer and a relatively short $C_3$ pulse is employed when inserting or deleting a character. If the output of gate 204 is low, the only high input signal to gate 205 will be the $\Phi_1$ pulse from gate 128 so the output signal from gate 205 will be quite short. The output of gate 204 will be low if there is an insert or delete signal present at any of terminals 182, 186 or 187. The output from gate 205 will then enable gate 209 only for the duration of the $\Phi_1$ pulse.

On the other hand, if the system is not in a Delete or Insert mode, the output from gate 205 will stay high and the duration of any high output from gate 209 will depend on the output from gate 208. Gate 206 will provide a high output where the buffer register is undergoing a 201 shift (i.e. the Q output from flip-flop 142 is high) or where an appropriate signal is present at terminal 207. Gate 208 will be enabled by the "off" condition of flip-flop 198 wherein the Q output of the latter is high. It will be remembered that the Q output goes low after the $\Phi_3$ pulse from gate 132 clocks flip-flop 198, so that gate 208 is enabled for the time from the beginning of a $\Phi_1$ pulse (or when flip-flop 198 is enabled) to the end of the following $\Phi_3$ pulse. This "long" output pulse from gate 208 is applied on line 82 to provide the Enable Keyboard to Storage Signal described in conjunction with FIG. 4, and is also applied to gate 209.

When the output pulse from gate 205 is the "short" pulse, the output from gate 209 will be similarly "short". When there are no insert or delete commands to gate 204, the output from gate 205 will be "long", hence the $C_3$ output pulse from gate 209 will then also be "long".

A decade counter 212 is provided for counting pulses in modulo ten and having an input terminal connected to a source of timing pulses (such as divider 264 which in turn has an input from line 211 to clock 116 (FIG. 6)). Counter 212 is of the type having an inverting disable terminal 213 so that an appropriate signal at terminal 213 will hold the counter to an initial state, usually zero or nine. Counter 212 typically is an arrangement of interconnected bistable stages such as flip-flops having output lines 214, 215, 216 and 217, as from the Q terminals of the flip-flops, for providing signals corresponding to counts of 1, 2, 4 and 8. Only the first three output lines 214, 215 and 216 from counter 212 need be connected to multiplexer 210 in known manner for controlling the sequencing of the signals on the input lines from register 94 into a serial signal at the multiplexer output. In order, for reasons adduced hereinafter, to determine each time a count of 8 is reached by counter 212, a "state 8" detector is provided and comprises AND gate 218 having one input connected to the count of 8 line 217 and another input connected through inverter 219 to the count of 1 line 214.

Means, such as AND gate 220, is provided for determining if a blank cell is present at the output of the buffer memory or register 94. Gate 220 as shown, has eight inverting inputs respectively connected to the eight output lines from register 94.

It is preferred to phase encode the output of the multiplexer and to this end there is provided a control flip-flop 222 which is preferably a J-K type device having its clock input connected by line 223 to the output of gate 134 (FIG. 6), its J input connected to the output of blank cell detector or AND gate 220, and its K input grounded. The $\overline{Q}$ output of flip-flop 222 is connected as one input to AND gate 224. The other input of AND gate 224 is connected to the output of multiplexer 210. The outputs of AND gate 224 and clock line 221 from divider 264 are connected as inputs to exclusive OR gate 226.

The output of exclusive OR gate 226 is connected as one input to AND gate 228. Another input to AND gate 228 is connected through inverter 229 to line 217 from counter 212. Counter output lines 214, 217 and clock line 221 are connected as inputs to AND gate 232. The outputs of the latter and from gate 228 are connected as respective inputs to OR gate 234. The output from the latter is connected through amplifier 236 to magnetic read/write head 238.

The system shown in FIG. 7 as thus described, functions as follows: a Carrier Return signal starts a series of one shifts in the buffer memory, until the bits representing the first character of a line are shifted to the eight output lines of the multiplexer which converts the eight parallel bits to eight serial bits in sequence and with a timing determined by the output from decade counter 212. The latter starts counting clock pulses on line 221 from a count of nine as soon as an enable write signal at terminal 213 enables the counter.

From the zero to seventh count by decade counter 212, the eight input lines are sequenced to provide a serial input to gate 224. Because in the absence of a high signal at the J input to flip-flop 222, the $\bar{Q}$ terminal of the latter is high, gate 224 is enabled to pass the serial bits of each character thus multiplexed. Exclusive OR gate 226, clocked by the signals on line 221 converts the output of multiplexer 210 into Ferranti coded signals wherein the value of a bit is indicated by its transition direction as explained hereinafter. When counter 212 provides the eighth and ninth counts by high signals on line 217 and line 214, no corresponding bits are provided at that time by the encoding logic. Instead, on the eighth count, the high signal on line 217, being inverted by inverter 229, disables gate 228. On the ninth count, the high signals on lines 214 and 217 together with the clock pulse on line 211 enable gate 232 which provides a regular pulse or bit to gate 234. Thus the eighth and ninth counts by decade counter 212 yield respectively no signal at all and one regular clock pulse at the input to amplifier 236. The eighth count space or lack of signal (hereinafter referred to as an intercharacter gap or ICG) is intended to provide spacing between serially recorded sets of character bits, whilst the ninth count pulse is intended to indicate the beginning of a character and is hereinafter referred to as the start bit. The output of amplifier 236 is applied to read/write head 238 so that as a magnetic storage medium such as a tape 18 in cassette 240 is transported past head 238 as by tape-transport motor 242 (see FIG. 11), the serial phase-encoded characters, the ICG and the start bit are all recorded on the tape 18.

The output from gate 218 is applied as hereinafter described to cause the buffer memory to execute another one shift. The foregoing will continue until a blank cell (which as noted in Table III is characterized as a sequence of eight zero bits) appears at the output of register 94. The blank cell will be detected by AND gate 220 which causes the J terminal of flip-flop 222 to go high and the $\bar{Q}$ terminal to go low. Thus, as soon as the meaningful data in register 94 has been transferred, the output of flip-flop 222 disables gate 224, effectively freeing the register, i.e., making it available for further entry of data from encoder gates 76.

The output of gate 218 is also preferably connected as through another input to OR gate 202, to counter 190 (FIG. 6) so that each character written on tape is counted by counter 190. At the 200th count of 8, as recorded by counter 190, the latter will provide a signal on line 156 which resets the Enable Write line 244. As noted below, the signal on line 156 also serves to stop motor 242. Line 244 is also connected to terminal 213 of counter 212 and to the clear terminal of flip-flop 222 to stop or disable counter 212 and to clear flip-flop 222 so that gate 224 is no longer disabled.

In the event, however, that for example register 94 only had ten characters recorded therein, upon depression of the Carrier Return key by the operator, the print head 16 would quickly return to its left hand margin position. By the time the print head 16 so returned, gate 220 would have detected the blank cell on the 11th shift and inasmuch as register 94 would then have been cleared, gate 224 would have been disabled. However, counter 190 would only have counted 11 pulses, hence decade counter would continue to operate and clock pulses along line 221 would be phase encoded by gate 226 as simply all zero bits. Of course, every eighth and ninth count would be recorded as proper ICG and start bits by operation of gates 232, 228 and 234. In this manner, null characters or sequences of eight zero bits will continue to be generated and recorded, until counter 190 reaches the count of 200, whereupon counter 212 and motor 242 will become disabled and the zero character generation and recording ceases.

The recording or data storage system 58 exemplified by motor 242, read/write head 238 and cassette 240, is preferably a dual capstan, bidirectional machine with a read and write tape speed typically of 10 inches per second. Such recording system, well known in the art, is capable of driving a tape 18 in a cassette 240 at its writing and reading speed and also at some higher rate of speed for search purposes. Read/write head 238 is preferably a known two-track digital type as heretofore noted.

The data are recorded on tape 18 in blocks 19 of 200 characters each block corresponding then to a complete buffer load, each character, as noted before, having eight bits corresponding to the bits of a character stored in the main register 94, an additional start bit and an ICG. These bits are Ferranti or phase-encoded which is a known system of encoding wherein the first half of each bit is recorded as the true sense of the bit (i.e., either a high or low level) and the second half is recorded as the bit complement. Thus, as noted, the direction of the transition from first to second half identifies the bit.

An example of a character which might appear at the output of register 94 is shown in FIG. 8A wherein the sequence of signals as shown is S, $R_1$, $R_2$, $R_2A$, $R_5$, $T_1$, $T_2$ and P. The foregoing signals then form a character with the sequence of bits 11010010. It is recognized that this character has even parity but is merely used in this description for the sake of simplicity. A sequence of clock pulses, shown in FIG. 8B, synchronize the operation of multiplexer 210 and gate 226 to produce the phase encoded signals shown in FIG. 8C. It should be noted in FIG. 8C that in accordance with the logical exclusive OR function of gate 226, the signal is high if and only if either the signal in FIG. 8A is high or the signal in FIG. 8B is high but not when both the signals in FIG. 8A and FIG. 8B are high. It will also be recognized as noted that the first transition of the signal in FIG. 8C constitutes a "start" bit or transition and, corresponding to the last "bit" of the signal is a low level or ICG.

As shown in FIG. 3, the system also includes read data circuits 60 for reading the phase-encoded data from tape 18 and for converting or demultiplexing in demultiplexer 62 the decoded data back into eight parallel bit characters suitable for insertion into the buffer memory for ultimate writing out by the printer 20 or for editing or revision. The remainder of the circuit of FIG. 7 thus includes read amplifier 246 connected to the output from read/write head 238. The output of amplifier 246 is connected to means such as rectifier/shaper 248 for half-wave rectifying the signal from amplifier 246 to provide an output train of, for example, positive rectangular pulses representing only the positive signal in the output of amplifier 246. Similarly, the output of amplifier 246 is connected through inverting amplifier 249 to means, such as rectifier/shaper 250 for half-wave rectifying the signal from amplifier 246 to provide another output train of, for example, positive rectangular pulses which however represent only the negative signals in the output of amplifier 246. The output of rectifier/shaper 248 is connected as one input to AND gate 252, as one input also to OR gate 254 and is connected to the set (S) terminal of RS type flip-flop called Control flip-flop 256. Similarly, the output of rectifier/-shaper 250 is connected as one input to AND gate 248 and also as another input to OR gate 254. The outputs of gates 252 and 258 respectively are connected to the set (S) and reset (R) inputs of another RS type flip-flop called data flip-flop 260. The $\bar{Q}$ output terminal of data flip-flop 260 is connected to the data input terminal of demultiplexer 62 which is shown preferably as an eight-bit shift register demultiplexer 262.

Means are provided for clocking the decoding of the signals from head 238, and to this end clock line 211 is connected to digital scaler or divider 264 which has an output pulse train which is a sub-multiple of the input clock frequency. An output of digital divider 264 (at a frequency four times greater than is provided to counter 212) is connected to counter 265, which is typically a simple binary counter formed of three cascaded flip-flop stages. The three outputs from counter 265, typically the Q terminals of the respective flip-flop stages, are connected as inputs to a binary-to-octal converter 266. The latter is a known system of gates which simply converts the binary output of counter 265 (which runs from zero to 7) to individual signals appearing in eight output lines each representing respectively the zero to seventh count or state of counter 265. Thus, for example, the first output line from converter 266 will be high if and only if the counter has counted a first input pulse and has not counted the next pulse. The zero, third and fourth state output lines from converter 266 are all connected as inputs to OR gate 267. The output of the latter in turn is connected to input terminals of AND gates 252 and 258. The second state or count output line of converter 266 is connected to the clocking input terminal of shift register 262. The fifth state or count line from converter 266 is connected to output line 268 and also as one input to AND gate 269. Clock line 211 is also connected as input to AND gate 269. The output of AND gate 269 is connected to the reset (R) terminal of control flip-flop 256.

The output of OR gate 254 is connected to the input of a data block monostable multivibrator 270, the enable input terminal of multivibrator 270 being connected to the output of OR gate 267. The output of monostable multivibrator 270 is connected through inverter 271 as one input terminal to AND gate 272. The Q terminal of flip-flop 256 is connected as the other input to AND gate 272. The output of AND gate 272 is connected to the clear input terminal of counter 265 and to an input of OR gate 273. Another input to gate 273 is connected to line 244. The output of gate 273 is connected to the clear input terminal of divider 264. Lastly, there is provided an Enable Read Data line 274 over which an enabling signal can be propagated to initiate reading and phase decoding a record. Line 274 is connected to inverting Clear terminals of flip-flop 256 and demultiplexer 262.

Figure 8:
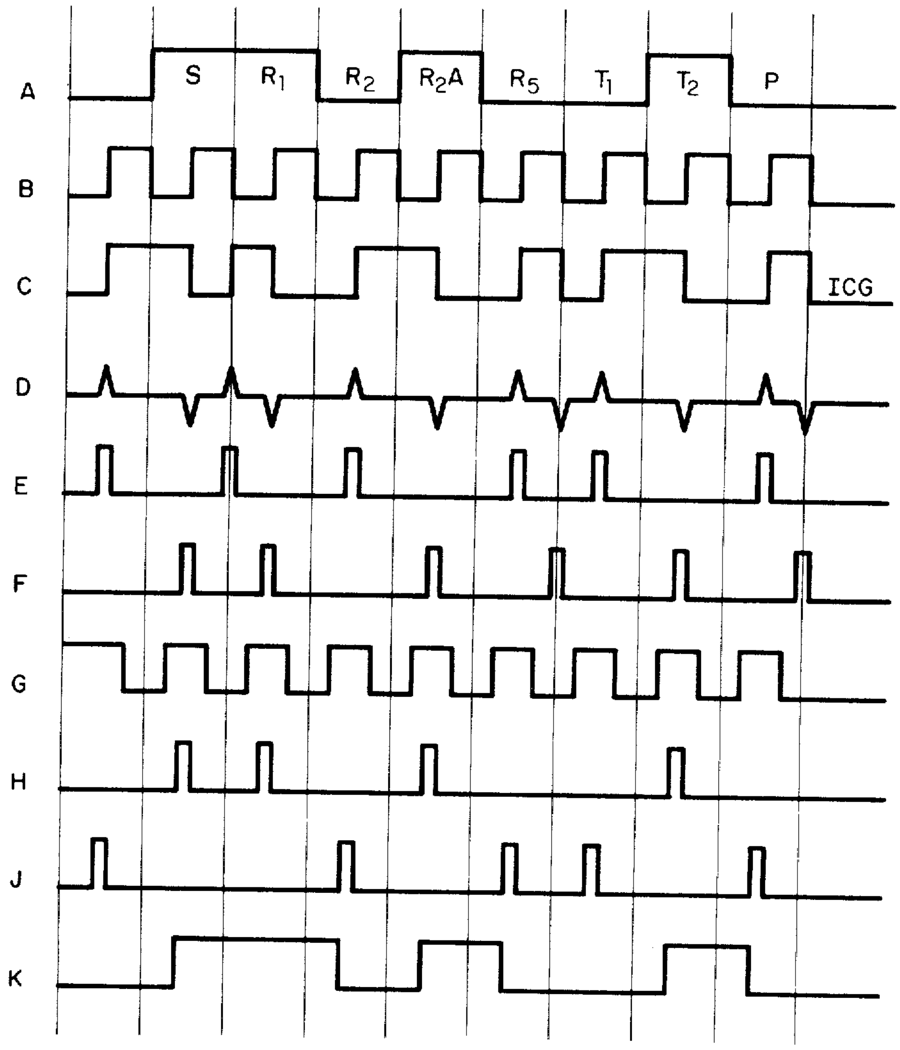
FIG. 8 is a timing diagram illustrating the operation of elements of FIG. 7.

In operation of the phase decoding portion of FIG. 7, reference should be had also to the timing diagram of FIG. 8. When it is desired to read data which has been stored in the tape 18 in cassette 240, an Enable Read signal on line 274 starts motor 242 so that the tape in cassette 240 is moved past read/write head 238. This produces a bipolar output shown typically at FIG. 8D, where each pulse or peak represents the location and sense of a transition in the phase-encoded signal stored on tape and shown in FIG. 8C.

Figure 11:
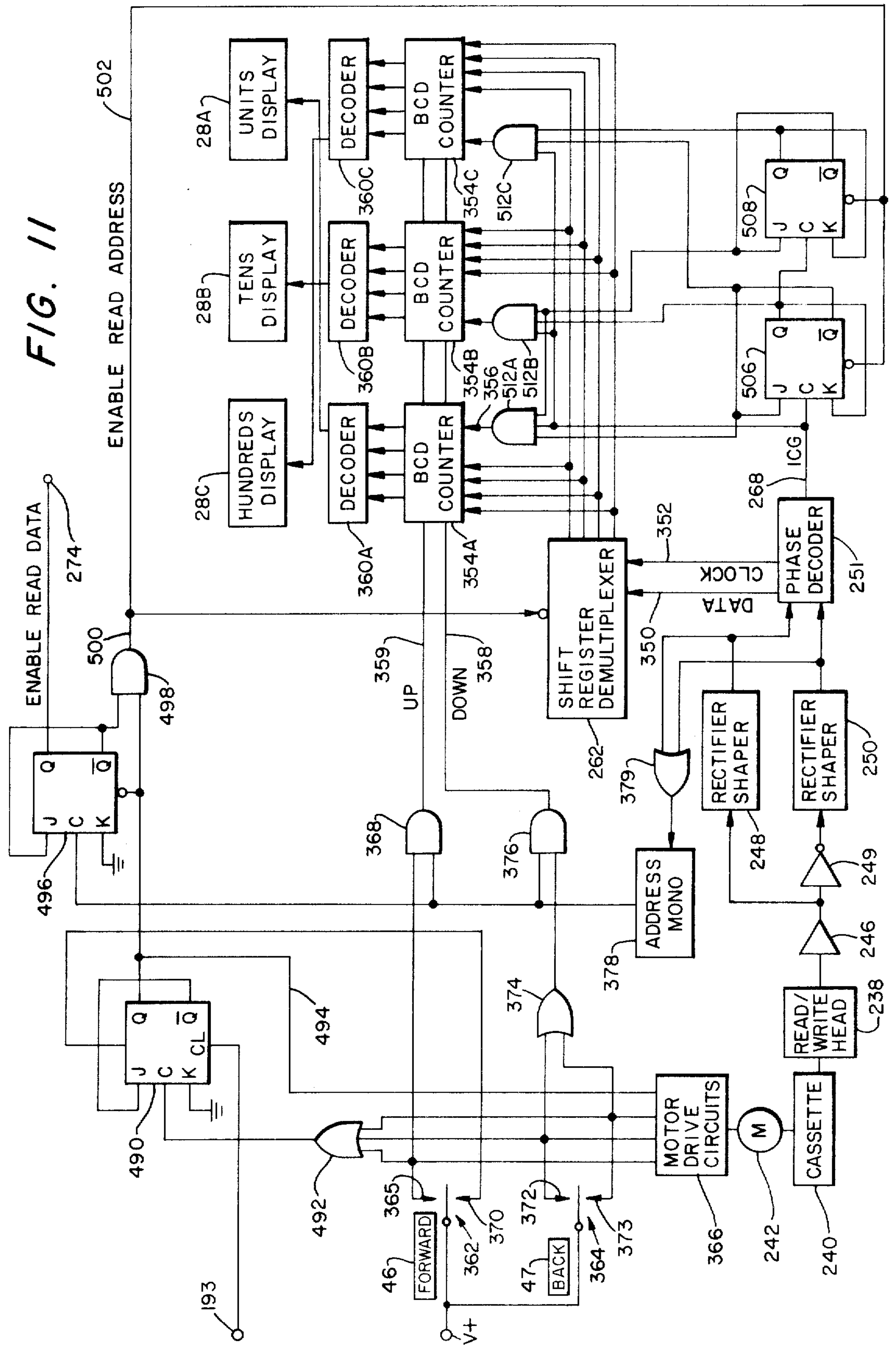
FIG. 11 is a diagram showing the tape search controls coupled with logic for monitoring and displaying data block addresses.
Figure 12:
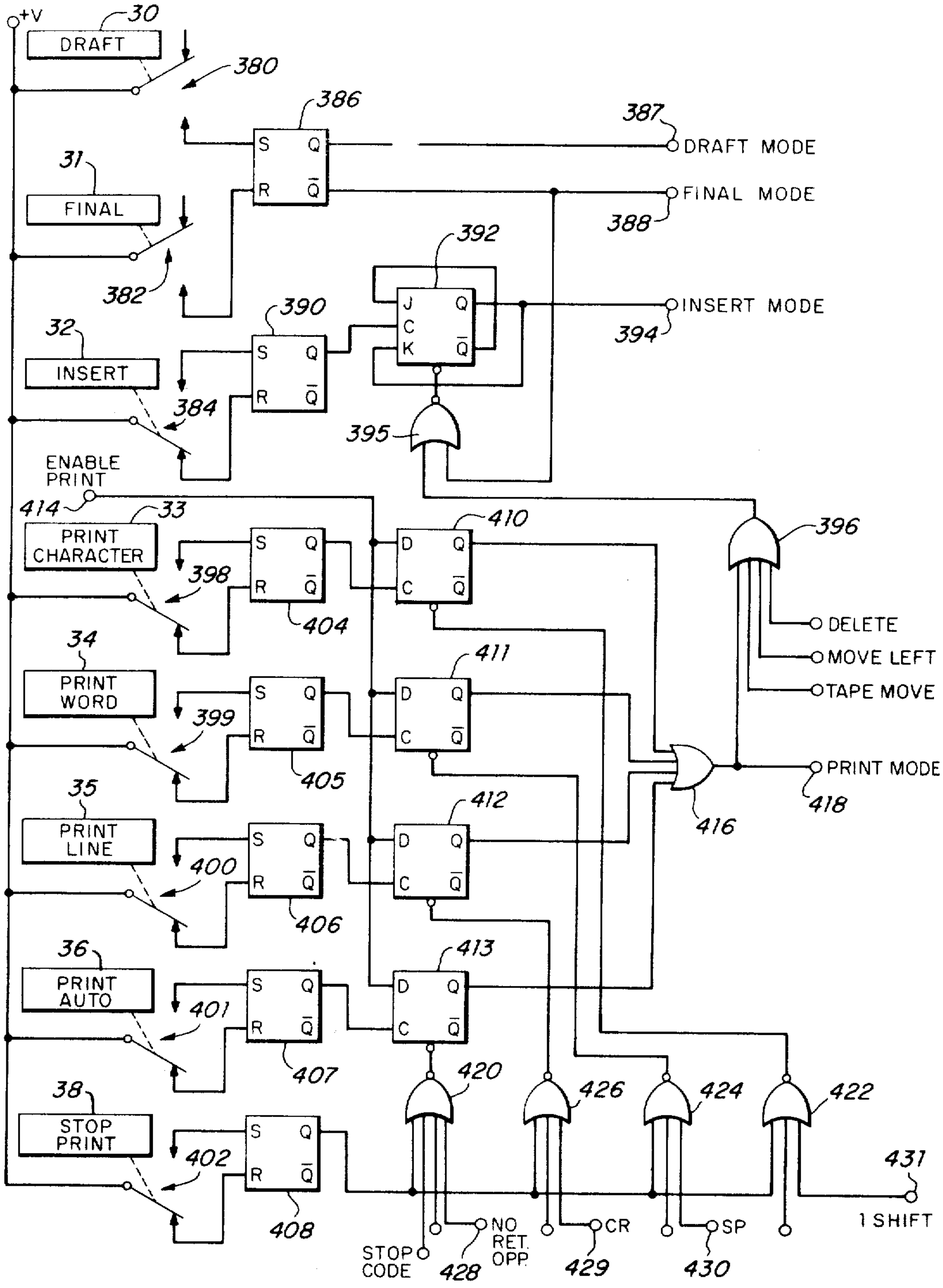
FIG. 12 is a diagram illustrating logic in the main control of FIG. 3.
Figure 13:
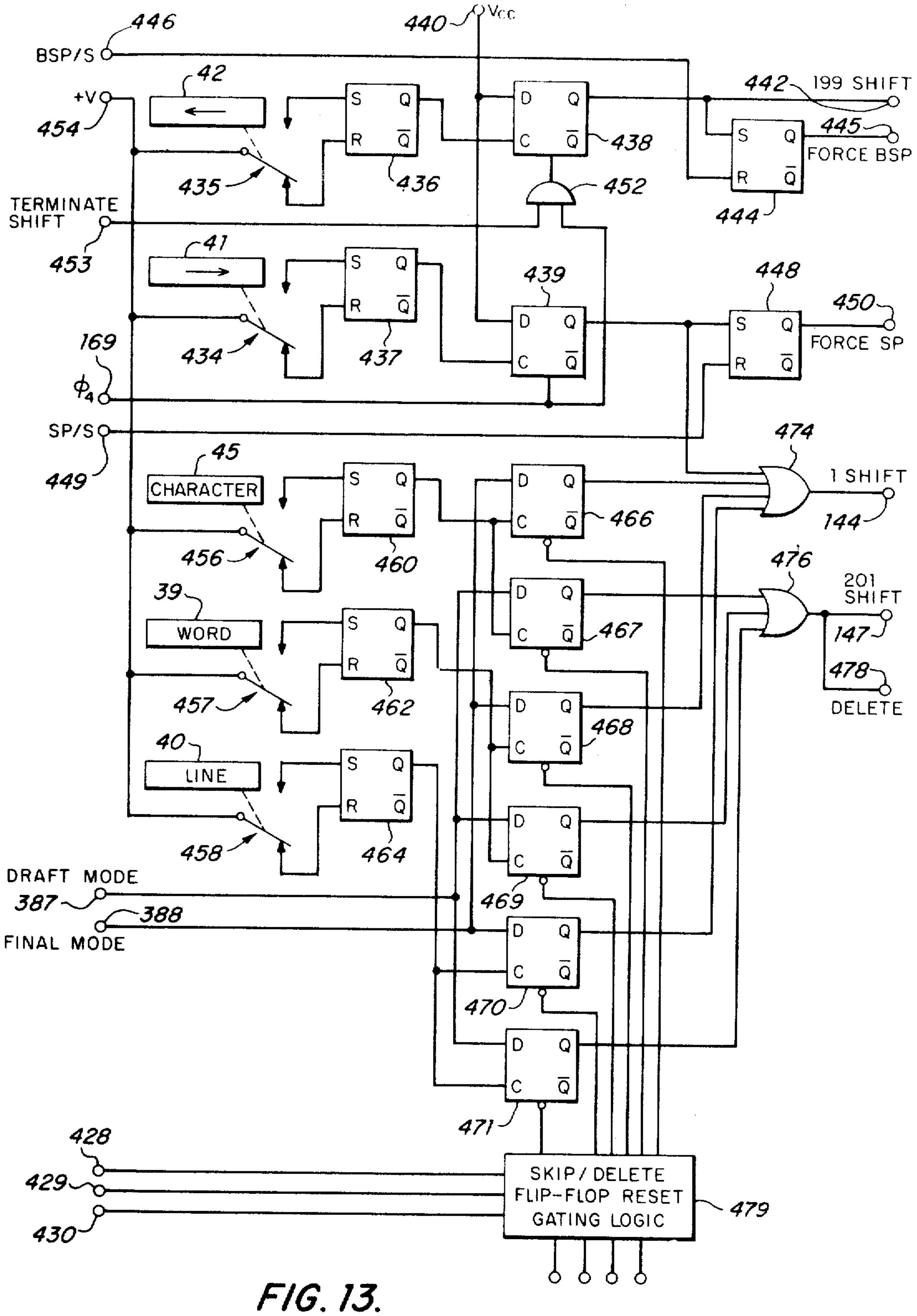
FIG. 13 is an additional logic diagram illustrating the main control of FIG. 3.

The read/write head output is amplified in amplifier 246 and is rectified and shaped by rectifier/shaper 248 to produce a train, typically of positive, shaped output pulses, as shown in FIG. 8E. By inversion of the output of read/write head 238 in inverter 249 and by operation of rectifier/shaper 250, a similar train of positive, shaped pulses, such as are shown in FIG. 8F, is produced representing however only the negative peaks of the original output train of FIG. 8D. It will be apparent then that the two trains of pulses applied as inputs respectively to gates 252 and 258 represent respectively all of the positive-going transitions in the original phase encoded signal of FIG. 8C and all of the negative going transitions of FIG. 8C, and that some of these transitions are "midbit" while some are "interbit." The phase decoder system, designated generally as 251 in FIGS. 7 and 11, is intended to reconstruct the original sequence of bits (as shown in FIG. 8A) from the information provided by the midbit transitions only. Thus it is intended to reject the signals corresponding to the interbit transitions and this is accomplished by establishing a gating signal or time "window" after each detected midbit transition and during an interval when the next midbit transition can be expected to occur. This window, shown as the pulse train of FIG. 8G is produced as the output signal from gate 267 which is applied as an enabling or window signal to gates 252 and 258 and monostable multivibrator 270.

Divider 264 is arranged so that counter 265 counts four pulses during each bit time of the original signal of FIG. 8A. Thus, when the counter sequences to count the first pulse, the count zero output line from converter 266 goes down and the first count output line, which is not used here, goes high. Thus, gate 267 has no output and there is no enabling window present at AND gates 252 and 258. Any pulse appearing during that time in the inputs of AND gates 252 and 258 from the shapers will be discarded. This is also true when the counter sequences to the next or second count. However, the leading edge of the pulse appearing on the second count line from converter 266 is used to clock shift register 262 and shifts the data in the latter along one bit. When the third pulse from divider 264 is counted by counter 265 the third count line from converter 266 brings the output of gate 267 high and enables gates 252 and 258. As will be seen, the window provided by gate 267 continues high during the fourth count and then goes low at the beginning of the fifth count.

Although converter 266 is an octal converter, only five of the eight output lines are used. It should be noted that all pulses in the outputs of both rectifier/shapers 248 and 250 are applied as inputs to gate 254, and that monostable multivibrator 270 is enabled by each window because the output of gate 267 is connected to the enable input of the multivibrator. Thus, if a pulse appears at either input to gate 254 at any other time than during a window, that pulse will neither trigger multivibrator 270 nor be passed by gates 252 or 258. On the other hand, when a pulse does appear during the third and fourth count in counter 265, that input pulse to gate 254 will also be passed by either gate 252 or 258, and because multivibrator 270 is enabled during that time, that pulse will also tirgger the multivibrator. The output of the latter, then serves to disable gate 272 so that counter 265 is reset and held in its reset state until the pulse from multivibrator 270 disappears, whereupon the counter resumes counting. Thus, as soon as a transition from gate 254 appears during the third or fourth count, counter 265 is reset and the zero count line then goes up and the window signal in the output of gate 267 stays up. In this manner all of the interbit transitions are effectively rejected because they cannot pass AND gates 252 and 258 and the counter is reset after each detection of a midbit to thereby provide another window signal. For each of the eight data bits in the original signal there will be a corresponding mid pulse transition which will appear either at the input of gate 252 or at the input of gate 258. All of the midbit transitions appearing at the input of gate 252, as shown in FIG. 8J of course are applied to the set terminal of flip-flop 260 and all of the midbit transitions pulses appearing at the input of gate 258 as shown in FIG. 8H will similarly be applied to the reset terminal of flip-flop 260. Thus the output of flip-flop 260 at its $\bar{Q}$ terminal will be a rectangular wave form which has positive-going transitions corresponding to the negative polarity midbit signals in the read/write head output, and will have negative-going transitions corresponding to the polarity midbit transitions in the read/write head output. This provides a wave form shown in FIG. 8K which is a reconstruction of the original wave form shown in FIG. 8A, phase-displaced ideally by one half of a bit.

If during the window time to midbit transition is detected, it is apparent that an intercharacter gap (ICG) instead has been found. At that point multivibrator 270 is enabled, but there will be no output from the latter to reset counter 265 back to zero because gate 254 has provided no triggering pulse. Instead, counter 265 will count a fifth count and consequently a signal will appear on the fifth count line of converter 266. This latter signal, indicative of the detection of an ICG, enables gate 269 so that the next clock pulse can be applied to the reset terminal of control flip-flop 256. The Q terminal of the latter then goes low, the output of gate 272 goes low and counter 265 is thus reset and held in its zero count state. Also, when an ICG appears, the signal on line 268 is also applied to terminal 144 (FIG. 6) to actuate flip-flop 136 and sequence the main register 94 by a single shift, transferring the output signals at the eight outputs of demultiplexer 262 to the main register 94.

Because the counter is then at zero count state, the zero count line from converter 266 is high and the output of gate 267 is high and thus enables gates 252 and 258. The midbit transition then seen by the gates is the start transition corresponding to the positive-going transition in the original clock pulse used in the phase-encoding of the next character of the original signal. The pulse corresponding to that start transition is applied to the $\underline{S}$ terminal of flip-flop 260 through gate 252 so that the $\bar{Q}$ terminal of the latter goes low if it is not already low. Also, the output of gate 267, being high, sets control flip-flop 256 so that the latter provides a high input signal to gate 272. This output of gate 267 also triggers multivibrator 270 which thus keeps gate 272 disabled despite the setting of flip-flop 256, but gate 272 is disabled only until the signal from multivibrator 270 subsides. At that point gate 272 enables counter 265 which starts to count from zero again, so that on the first count, gate 267 is disabled and the sequence described above reoccurs.

It is apparent from the nature of phase-encoding and the details of the read logic used that data can be decoded reliably despite considerable timing errors such as might be due to tape speed variation and the like.

The decoded signals, appearing at respective lines on the output of demultiplexer 262 are then the respective R1, R2, R2A, R5, T1, T2, S and P signals. These output lines from demultiplexer 262 are connected to the respective terminals identified as Inputs From Read Data Circuits shown in FIG. 5 and thereby can be introduced back into the main memory register 94.

All 8 lines at the output of the main memory register are also connected as inputs to print control logic 68 as noted in FIG. 3. As shown particularly in FIG. 9, the R1, R2, R2A, R5, T1, and T2 lines from register 94 are connected to respective input terminals of a like plurality of enable gates 280. All of the output lines from register 94 are also connected to respective input terminals of parity checking circuit 282.

In order to decode the characters which represent operator functions, there is provided operator decoding circuit or decoder 284 having six input terminals respectively connected to the R1, R2, R2A, R5, T1, and T2 outputs from register 94. The decoder, well known in the art, is merely a group of gates connected so as to decode the operator function signals shown in Table II and provide an output signal on a corresponding operator line when the requisite input operator signal has been detected or decoded. Thus, decoder 284 has output lines respectively identified as SP (Space), CR (Carrier Return), BSP (Back Space), CI (Carrier Index), TAB, TABS (Tab Set) and TABCL (Tab Clear). These latter output lines are connected as inputs to a plurality of enable gates 286. Decoder 284 also includes gating which will provide an output on line 287 whenever the decoder determines it has decoded an operator code, i.e., whenever an output signal appears on any other line from decoder 284. Typically a simple OR gate will serve this function. If the signal at the input to decoder 284 is not an operator function signal but instead is an information character signal then decoder 284 provides an output signal on line 288. In addition decoder 284 includes gating for detecting the presence of a hyphen code (Table I) at the output of register 94 and for providing responsively thereto an output signal on line H to terminal 289.

It is desirable to inhibit transfer of information from the print control logic to the printer 20 when the latter is performing a function or is otherwise busy. To this end, there is provided Print-Busy OR gate 290 having a plurality of inputs thereto. One of the inputs is a $\overline{\text{Print Mode}}$ signal simply derived as the inverse of a signal generated by depression of Print Buttons 33,34,35 or 36 indicating that the device is not in the Print Mode and that the printer 20 is therefore available for operation of the keyboard by the operator. Another of the inputs to OR gate 290 is a CIM (carrier-in-motion) signal indicating that the print head 16 of the output printer 20 is being transported from right to left; such signal is derived from a carrier-in-motion sensor in baseplate 24. Yet another input line to OR gate 290 is a PIM line for carrying a signal indicating that the print head 16 is in motion or that some character is being printed out by the print 16 head and the latter is not ready to print another character. The PIM signal also is provided by an appropriate sensor in baseplate 24. Another input line to OR gate 290 identified as Function From Keyboard from encoder gates 76 in FIG. 4, is intended to carry signals from any sensor in baseplate 24 which provides a signal that an operator function such as space, carrier index or the like, is occurring. Yet another input to gate 290 is a line for carrying a CR or carrier return signal from an appropriate sensor in baseplate 24. An additional line to OR gate 290 is intended to carry, in a preferred embodiment of the invention, delay pulses which are related to typewriter dynamics and which are intended to adjust the operation of the print control logic to match the timing peculiarities or other operating idiosyncracies of the type of printer 20 being used with the system. The output of OR gate 290 is connected as one input to NOR gate 292, another input to gate 292 being the output of parity checking circuit 282. The output of NOR gate 292 is applied as an input to both AND gate 294 and AND gate 293. Another input to gate 294 is line 288, and the output of gate 294 is connected to the enabling input terminal of enabling gates 280.

The output of gate 294 is also connected to provide a signal (CC) to enable a cycle clutch in the printer 20, in known manner, to permit the print mechanism to be driven. Similarly, the other input to gate 293 is line 287 and the output of gate 293 is connected to the enabling input terminal of enable gates 286. The outputs of enable gates 286 are thus four lines, each connected to appropriate mechanisms in baseplate 24, for carrying signals representing the functions CI, TABS, TABCL and TAB, and three other lines for respectively carrying signals representing the functions SP, BSP and CR.

The outputs of enable gates 280 are the six lines R1, R2, R2A, R5, T1 and T2, connected to the baseplate 24 through a data selector or switching mechanism that will permit selectively the print out of data from the buffer or addresses in one embodiment.

Figure 9:
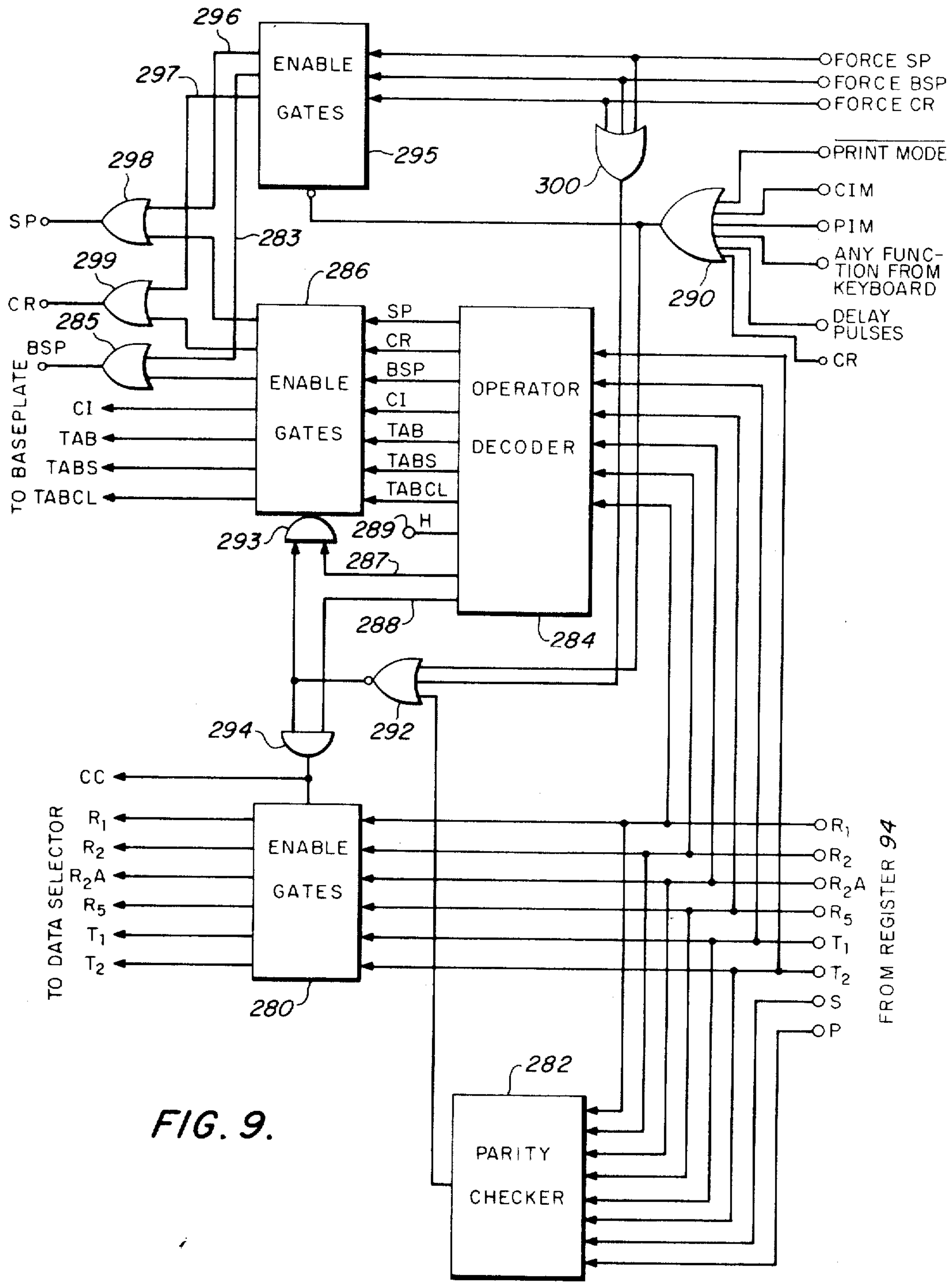
FIG. 9 is a logic diagram partly in block form, showing the print control logic system of FIG. 3.

The schematic of FIG. 9 also includes three more input terminals, one marked Force SP, one marked Force BSP and the last marked Force CR. The input signals at Force SP and Force BSP terminals are derived from operation of the Step Right and Step Left Buttons 41 and 42 and are intended to provide a compulsory Space signal and a compulsory Backspace signal to the baseplate. Similarly, the input signal at Force CR terminal is derived from logic used for Right-Hand Margin Adjust and is intended to provide a compulsory Carrier Return signal to the baseplate. Force CR, Force BSP and Force SP terminals are thus connected to appropriate input terminals of enable gates 295, the latter having an inverting enabling terminal connected to the output of gate 290. Gates 295 thus have three output lines 296, 283 and 297 respectively connectable to the Force SP, Force BSP, and Force CR inputs according as gates 295 are enabled or disabled. Line 296 and the SP output line of gates 286 are connected as inputs to OR gate 298, the output of the latter then being connected as the SP input line to baseplate 24. Line 283 and the BSP output line of gates 286 are inputs to OR gate 285 which has its output connected as the BSP input to the baseplate. Similarly line 297 and the CR output line from gates 286 are connected as inputs to OR gate 299, the output from gate 299 in turn being connected as the CR input line to baseplate 24. Input Force SP, Force BSP and Force CR lines are all connected as inputs to OR gate 300. The output of the latter is connected as an additional input of NOR gate 292.

In operation of the system shown in FIG. 9, as register 94 shifts, the 8-bit parallel signals appear in sequence at the register output and all eight bits are applied to parity check logic 282. The latter, in known manner, sums the bits. Because the present system requires odd parity, logic 282 provides a high output signal to gate 292 only if the sum of the bits is even. If any of the signals at the input of gate 290 are high then a high output signal is also applied to gate 292. Because the latter inverts, a high input signal to gate 292 disables gates 293 and 294. Similarly the output of gate 290 when high serves to disable gates 295. Lastly, the output of gate 300, when high, is applied as an input to gate 292. Thus, in the event that (1) a "wrong" or even parity signal is at the output of register 94, or (2) signals indicate that the Printer is busy, i.e., PIM, CIM, CR or Function from Keyboard, or (3) delay pulses are at the input of gate 290, or (4) the system is not in the Print Mode of operation, or (5) a Force SP, Force BSP or Force CR signal is present, gates 280 and 286 will be disabled and thereby prevent initiation of any action of the printer 20 by any output of register 94.

When the operator depresses Step Right button 41, data in storage is shifted by one character and it is then necessary to command a corresponding step of one space by the carrier or print head 16 in the printer 20. Hence, Force SP signal is generated by depression of button 41 and is coupled through gates 295 and 298 to the appropriate input terminal of baseplate 24 to initiate such print head stepping.

In certain instances when printing out the register contents, it will be necessary for the system to initiate a Carrier Return signal to the printer although no CR signal is recorded in the register at that point. Hence, the system includes a source of the Force CR signal. Such source is typically a flip-flop activated responsively to appropriate logic covering a number of situations where a CR signal must be initiated. The Force CR signal is coupled through gates 295 and 299 to the proper input terminal of the baseplate to compel a Carrier Return function by the print carrier or head. In case of either a Force SP, Force BSP or Force CR signal being produced, these signals will serve to disable gates 286 and 280 so that the contents of register 94 cannot be used to activate the baseplate.

As previously noted, when typing data into the register when the system is in the Draft Mode, a single or a 201 shift cycle is used and the clocking of register 94 and the subsidiary registers occurs in the $X_1X_3X_2$ sequence. Similarly, inserting data from the keyboard into the memory when the system is in the Insert Mode involves a 201 shift cycle where the clocking order is initially $X_1X_2X_3$ but changes to $X_1X_3X_2$ during the 201 shift cycle when a blank cell is detected in the memory. Similarly, the operation of deletion of a character is accomplished by a 201 shift cycle. As noted single shifts of register 94 are used along with the $X_1X_3X_2$ clocking sequence when in the Print Mode, i.e., to print out from the memory.

Figure 10:
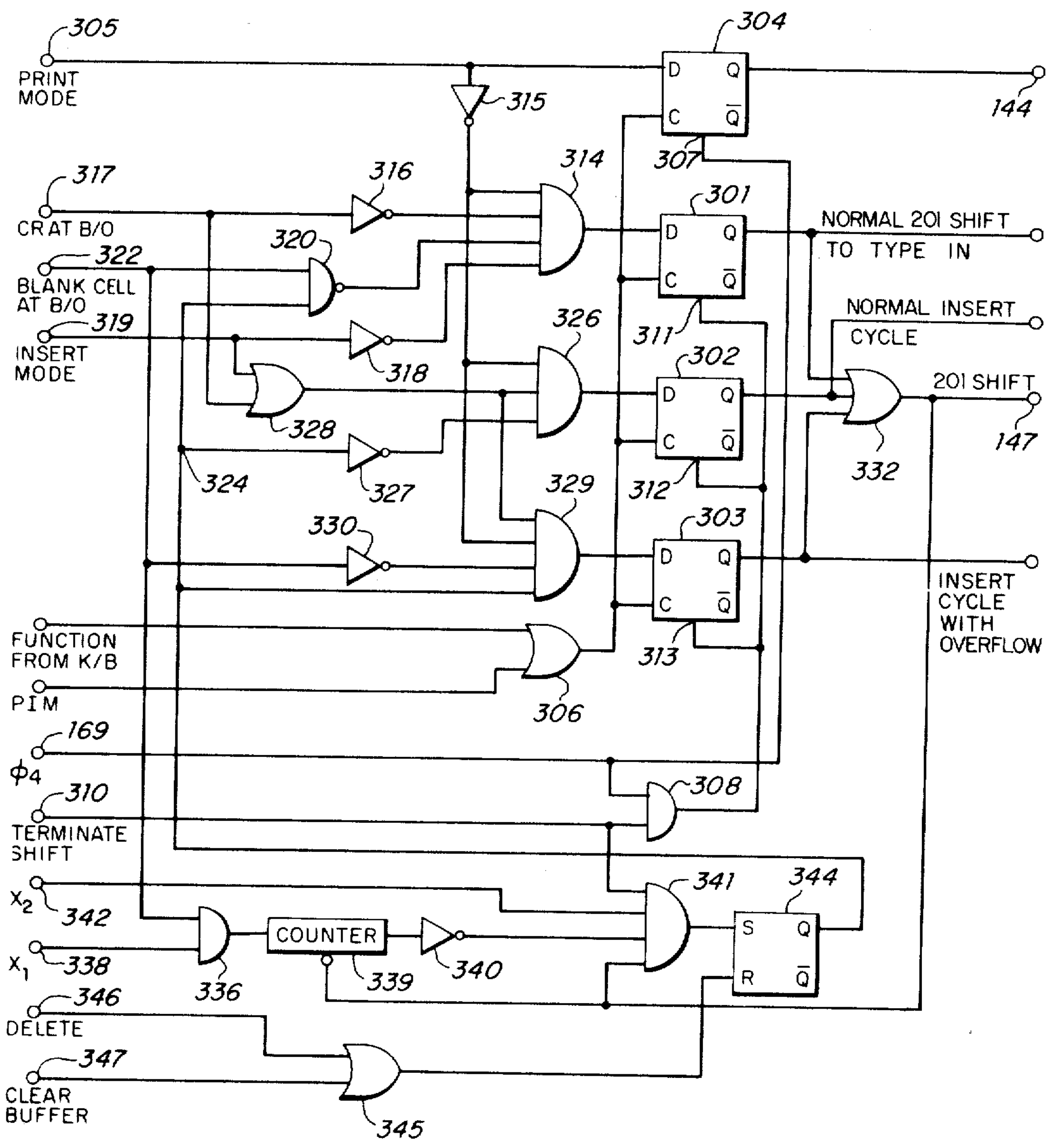
FIG. 10 is a diagram illustrating some logic employed in the main control of FIG. 3 for controlling clocking of the buffer memory.

To effect the foregoing operations, the system includes logic in buffer control originally shown in block in FIG. 3 at 70 which, in a simplified version is illustrated in FIG. 10 and includes four D-type flip-flops 301, 302, 303 and 304. Flip-flop 304 is intended to provide signals controlling the single shifts when in the Print Mode. Thus, the D input terminal of flip-flop 304 is connected to terminal 305 at which a Print Mode signal, derived by operation of any of the print buttons 33, 34, 35, or 36 is intended to be applied. The Q terminal of flip-flop 304 is connected to terminal 144 of flip-flop 136 (FIG. 6). The C or clock input terminal of flip-flop 304 is connected to the output of OR gate 306. The latter has a pair of input terminals, which are respectively connected to the outputs from encoder gates 76 shown in FIG. 4 as PIM and Function from Keyboard. The output of gate 306 is also connected to the C input terminals respectively of flip-flops 301, 302, 303 and 304.

The logic diagram of FIG. 10 also includes input terminal 169 which is at the output of gate 134 (FIG. 6). Terminal 169 is connected to the clear input terminal 307 of flip-flop 304. Terminal 169 is also connected as an input to AND gate 308, the other input to which is terminal 310 which is connected to output line 156 of counter 190 (FIG. 6). The output of gate 308 is connected to clear input terminals 311, 312 and 313 of flip-flops 301, 302, and 303 respectively. A group of logic gates are provided for operating flip-flops 301, 302 and 303, and include AND gate 314 having its output connected to the D input terminal of flip-flop 301 and having four input terminals, one of which is connected to terminal 305 through inverter 315. Another of the input terminals to gate 314 is connected through inverter 316 to terminal 317 which is the CR line output of decoder 284 (FIG. 9). A third input to gate 314 is through inverter 318 from input terminal 319. The last input terminal of gate 314 is connected to the output terminal of NAND gate 320. The inputs to gate 320 are respectively connected to terminal 322 and line 324 from RS flip-flop 344.

The D input terminal of flip-flop 302 is connected to the output of second AND gate 326 which has three input terminals, one of which is connected to the output of inverter 315, a second of which is connected through inverter 327 to line 324 and the last of which is connected to the output of OR gate 328. OR gate 328 has one input connected to terminal 319 and the other input connected to terminal 317.

The third AND gate 329 has its output connected to the D input terminal of flip-flop 303. Gate 329 has four input terminals, one connected to the output of gate 328, another connected to the output of inverter 315, a third connected to line 324 and a fourth connected through inverter 330 to terminal 322. Lastly, the Q output terminals of flip-flops 301, 302 and 303 are all connected as inputs to OR gate 332, the output of the latter being connected in turn to terminal 147 (FIG. 6).

The buffer control logic shown in FIG. 10 controls the buffer in accordance with the following operation. As previously noted, the signal intended to be applied at terminal 305 is derived from operation of any of the four print buttons. The Q terminal of flip-flop 304, as is typical of D-type flip-flops, will go high when simultaneously both the signal at input D is high and the signal at C terminal goes high. Thus, when the signal at terminal 305 is high and there is PIM or Function from K/B signal, then the Q terminal of flip-flop 304 will go high. When signal at terminal 144 goes high, as previously described in connection with FIG. 6, the Q terminal of flip-flop 136 goes high and the data in register 94 is shifted one cell. The first $\theta_4$ pulse at terminal 169 will clear flip-flop 304 so that its Q terminal goes low. Thus each time a character is printed or a function is executed on the printer, the buffer is shifted one place so that the next stored character is available.

If however, the device is not in the Print Mode and the signal at terminal 305 is therefore not high, the output of inverter 315 will however apply a high signal to each of AND gates 314, 326 and 329. As noted, terminal 317 is connected to the CR output line from decoder 284 in FIG. 9 and therefore is intended to carry a signal indicative that a carrier return function signal has been noted at the buffer memory output. Similarly, terminal 322 is connected to the output of gate 220 (FIG. 7) and thus is intended to provide a signal indicative of detection of blank cell at the buffer memory output. Line 324 is intended to have applied thereto a signal derived as hereinafter explained indicating that the buffer is full. Lastly, at terminal 319 there is intended to be applied a signal indicating that insert button 32 has been depressed and that the system is therefore to operate in the Insert Mode. It will be seen then that the output signal from the gate 314 goes high only when (1) the system is not in the Print Mode, (2) there is no carrier return signal at the buffer output, (3) the device is not in the Insert Mode and (4) the buffer is not full with a blank cell at the buffer output. All of these negative requirements therefore indicate that the device is to operate in its "normal mode." Hence, flip-flop 301 provides at its Q output a normal shift signal for typing in data from the keyboard when the output of gate 314 is high and if either a PIM or Function from K/B signal is present.

Similarly, there will be high output from gate 326 when (1) the system is in an Insert Mode or a carrier return signal appears at the buffer output, (2) the system is not in the Print Mode and (3) the buffer memory is not full. This output from gate 326 causes flip-flop 302 to also provide an output signal which indicates that a Normal Insert Cycle is to operate and which is fed both as in input to gate 332 and to terminal 187 (FIG. 6).

Gate 329 will provide a high output only when (1) the system is either in an Insert Mode or a carrier return signal appears at the buffer output, (2) a blank cell is not at the buffer output (3) the buffer is full and (4) the system is not in the Print Mode. In such case, the resulting output signal from flip-flop 303, applied as an input to gate 332, also is applied at terminal 182 to control buffer clocking for the Insert Cycle with Overflow operation.

Resetting of flip-flops 301, 302 and 303 occurs when both a terminate shift signal is present at the output of counter 190 (FIG. 6) and a $\theta_4$ signal is present at terminal 169. The output of gate 332 is applied to terminal 147 to bring the J input of flip-flop 142 (FIG. 6) high and therefore initiate a 201 shift as previously described. It should be noted that D type flip-flops are used particularly because it is desired to do a 201 shift on the leading edge of the pulse from gate 306.

Included in the circuit of FIG. 10 are means for detecting when its memory is "full." The foregoing means comprises AND gate 336 having one input connected to terminal 322 and the other input connected to terminal 338. The latter is preferably connected to $X_1$ line 97 (FIG. 5) so that normal $X_1$ clocking signals applied to single-bit register 96, will also be applied at terminal 338. The output of gate 336 is connected to the input of counter 339. The latter has an enable input terminal which is connected to terminal 147. Counter 339 is a counter, which after being enabled, counts the first three input pulses from gate 336 and then provides a high output signal indicating that three pulses have been counted, whereupon the counter stops counting. Such counter can be readily formed of a pair of flip-flops as is well known in the art. The output of counter 339 is connected through inverter 340 as one input to AND gate 341. Gate 341 also has as inputs thereto a line connected to terminal 310, another line connected to terminal 147, and a fourth input connected to terminal 342. Terminal 342 is connected to $X_2$ line 95 (FIG. 5) so that any signals applied for clocking shift register 94 (FIG. 5) will also be applied at terminal 342.

The output of gate 341 is connected to the S input terminal of an RS type flip-flop 344. The Q output terminal of the latter is connected to line 324. Lastly, OR gate 345 is provided, having its output connected to the R terminal of flip-flop 344 and having a pair of input lines respectively connected to terminals 346 and 347. At terminal 346, there is intended to be applied a signal indicating that a Delete function is being performed, which signal is derived hereinafter described. The signal to be applied at terminal 347 is a signal which will cause a clearing of the buffer memory and for example may be derived from Enable Write line 244 (FIG. 7).

The portion of FIG. 10 just described detects the "full" buffer in accordance with the following operation. A signal at the output of gate 332 will, as previously noted, initiate a 201 shift by being applied at terminal 147. The same signal enables counter 339. During the 201 shift, every $X_1$ pulse, being applied at terminal 338, will serve to enable gate 336. However, the output of the latter goes high only when a blank cell is detected at the output of register 94 and a corresponding pulse is therefore applied at terminal 322. Counter 339 then counts, for example, the first three blank cells detected during that 201 shift, then stops counting as the output of the counter goes high. Simultaneously, the input to gate 341 from gate 332 will remain high during the 201 shift, as will the periodic timing signals applied to gate 341 from terminal 342. When the terminate shift input signal, indicating that the 201 shift has been completed, is applied at terminal 310, gate 341 is then interrogated to see if less than three blank cells were counted.

If counter 339 has counted at least three blank cells, its output signal will be high and thus inverter 340 will apply a low signal to gate 341, disabling the latter. If however, counter 339 has counted less than three blank cells, gate 341 then, when interrogated by the signal at terminal 310 and if all of its other inputs are high, will provide a set pulse to the S terminal of flip-flop 344 at $X_2$ time.

In other words, flip-flop 344 will be set when a 201 shift has been executed and less than three blank cells have been seen at the output in $X_1$ time during that shift. Setting of flip-flop 344 provides an output signal on the Q terminal thereof which is applied to line 324 and which indicates that the buffer memory is full. Flip-flop 344 will be reset by the output of gate 345 if anything is deleted from the buffer as indicated by a Delete signal at terminal 346 or if a record is written on to tape 18 as indicated as by a Write Enable signal which will clear register 94 and which is applied to terminal 347.

It should be noted that if less than three blank cells are seen one may infer that only two or less are seen by counter 339. This implies that if only two cells are seen, only one will be left when the 201 shift cycle is complete. Because for proper operation of the system at least one blank cell must be left at all times, it is apparent that a "full" buffer can be defined as one in which, during the 201 shift, counter 339 counts less than three blank cells at the output of register 94.

As shown in FIG. 11, which illustrates the tape control circuitry, the address display logic and read address circuits include shift register demultiplexer 262 (FIG. 7). The latter has the inputs shown in FIG. 7—namely, line 274 along which an Enable Read Data signal can be sent, line 350 which is the data line coupled to the $\bar{Q}$ output of flip-flop 260, and line 352 which connects the second count output line of converter 266 to the clocking input terminal of shift register demultiplexer 262. The decoded signals, appearing at respective lines at the output of demultiplexer 262 are, of course, the respective R1, R2, R2A, R5, T1, T2, S and P lines. Four of these lines are connected to the preset inputs of three counters 354A, 354B and 354C.

Counters 354A-C are preferably up-down, presettable, clocked counters well known in the art capable of counting in a binary coded decimal mode. Each counter has a line 356 on which an enable signal can be applied to preset it. Each counter also has an input decrement line 358 and an input increment line 359 (for convenience only the input decrement and increment lines of counter 354A are identified by the aforesaid numerals). The input decrement and increment lines of counters 354B and 354C are connected to respond to counters 354A and 354B respectively. The outputs of counters 354A, B and C are connected to code converters 360A, B and C respectively which are adapted to convert the count in the associated counters to a proper format for display in display units 28A, B and C respectively. The latter are single digit display devices, with display unit 28A indicating the least significant digit, display unit 28B displaying the next significant digit and display unit 28C displaying the next most significant digit. More specifically, display unit 28A displays "ones," display unit 28B displays "tens" and display unit 28C displays "hundreds" so that together they can display any number from "000" to "999."

FIG. 11 also includes, in schematic form, Tape Forward button 46 and Tape Back button 47, connected to respective switches 362 and 364, the switch armature in each case being centrally spring-biased and coupled to a source of voltage +V. The up or fast forward terminal 365 of switch 362 is connected as an input to motor drive circuits 366 and also to an AND gate 368. Both the up or fast reverse terminal 372 and the down or slow reverse terminal 373 of switch 364 are connected as respective inputs to motor drive circuits 366 and also as inputs to an OR gate 374. The output of OR gate 374 is connected as an imput to an AND gate 376.

Motor drive circuits 366 are of conventional design and are connected in known manner for controlling the direction and speed of motor or motors 242. Essentially they consist of four circuits adapted to selectively cause the motor to operate in one direction or the other at a fast speed or a slow speed. As previously noted, motor 242 is mechanically coupled to control the movement of tape 18 in cassette 240 past read/write head 238, and the output of the latter is amplified in amplifier 246. Also as previously noted, the output of amplifier 246 is connected to rectifier and shaper 248 and also via inverter 249 to rectifier and shaper 250. The outputs of the rectifier-shaper circuits 248 and 250 are connected via an OR gate 379 as an input to an Address monostable multivibrator or one-shot 378. The output of the latter is connected to respective inputs of two AND gates 368 and 376 and also to the clock terminal of a JK flip-flop 496. The outputs of AND gates 376 and 368 are connected to input decrement line 358 and increment line 359 respectively of counter 354A.

The terminals 365 of Tape Forward switch 362 and the terminals 372 and 373 of Tape Back switch 364 are connected to different input lines of an OR gate 492. The latter's output line is connected to the clock terminal of flip-flop 490. The K terminal of flip-flop 490 is grounded while its Q terminal is coupled to its J terminal. The clear terminal of flip-flop 490 is connected to terminal 193 (of the buffer memory clocking control system shown in FIG. 5) on which an output signal pulse appears when the counter 190 has counted 200 input pulses. The set terminal of flip-flop 490 is connected to the slow forward terminal 370 of Tape Forward switch 362. The Q terminal of flip-flop 490 is connected via a line 494 to the input terminal of one of the motor drive circuits 266 that causes the motor 242 to operate in a slow forward speed mode when the aforesaid Q terminal goes high. The Q terminal of flip-flop 490 also is connected to the inverting Clear terminal of another JK flip-flop 496 and also to one of the input lines of an AND gate 498. The K terminal of flip-flop 496 is grounded while its J and $\bar{Q}$ terminals are coupled together and are also connected to a second input line of gate 498. The Q terminal of flip-flop 496 is connected to an Enable Read Data output line 274 which, as previously noted in FIG. 7, is connected to an inverting clear input terminal of shift register demultiplexer 262. The output of AND gate 498 also is connected via a line 500 to the demultiplexer enable input terminal.

The output of AND gate 498 also is connected via an Enable Read Address line 502 to the inverting Clear input terminals of two JK flip-flops 506 and 508 that are connected to function as a 2-bit counter and serve to control the sequence of operation of the BCD counters 354A-C. The ICG output line 268 of the phase decoder 251 is connected to the Clock terminal of flip-flop 506. The latter's J and $\bar{Q}$ terminals are coupled together, as are its Q and K terminals. The Q terminal of flip-flop 506 also is connected to the Clock terminal of flip-flop 508. The latter's J and $\bar{Q}$ terminals are coupled together, as are its Q and K terminals. Flip-flops 506 and 508 control operation of counters 354A–C via three AND gates 512A–C whose output terminals are connected to the respective load terminals of the three counters. One input terminal of each of the three AND gates 512A–C is connected to the ICG line 268; another input line of each of gates 512A and 512C is connected to the Q terminal of flip-flop 506; another input line of each of gates 512A and 512B is connected to the $\bar{Q}$ terminal of flip-flop 508; and gates 512B and 512C have additional input lines connected to the Q terminals of flip-flops 506 and 508 respectively.

The operation of the device of FIG. 11 to identify and display the address of a block of data on tape in cassette 240 can be described as follows. It will be appreciated that, as previously noted in connection with FIG. 2A, the data addresses 48 are typically prerecorded on a second track 29 on the cassette tape 18 and are read from the tape preferably by one track of the dual read/-write head 283. The output of both heads would normally be applied through the decoding circuitry of FIG. 7 so that both the data on track 25 of the tape and the address information on track 29 will appear on line 350 to shift register demultiplexer 262. To avoid the simultaneous appearance of information from both tracks 25 and 29, it is of course necessary to insure that the data recorded on track 25 is not positioned adjacent an address, so that the two tracks can only be read out in a mutually exclusive fashion. Alternatively, one can record addresses and other data in sequence on a single track. The addresses are preferably read out into demultiplexer 262 in binary coded decimal form to appear on the four output lines of the demultiplexer that are connected as the BCD preset inputs of counters 354A–C. The latter are preset via line 268 and gates 512A–C at the intercharacter gaps associated with the recorded addresses so that no data can be transferred thereto from the shift register demultiplexer 262 except address information.

The outputs of counters 354A–C are converted in decoders 360A–C to a form suitable for display in display devices 28A–C. The nature of the decoders is dictated by the type of display desired. For example, if the display devices 28A–C provide seven segment displays, then the decoders will be BCD-to-seven-segment converters. Similarly, if the display devices are Nixie tubes, then decoders 360A–C would be BCD-to-decimal converters. Such converters are, of course, well known in the art and need be described no further here.

The system of FIG. 11 is designed to accommodate the following conditions in any of the fast forward, fast backward, or slow backward modes of tape transport: (*a*) data cannot be read and (*b*) addresses cannot be read. The system also is designed to meet the following requirements: (*a*) when the motor is operating in the fast forward, fast backward or slow backward modes, the counters 354A–C are incremented or decremented (according to the direction of tape movement) each time an address is detected by the read/write head; (*b*) when the motor 242 is operating in the slow forward mode, the counters 354A–C are set according to the actual address read from the tape, and (*c*) when the fast forward, fast backward or slow backward modes of tape transport are terminated, the motor 242 is caused to operate in the slow forward mode so that the next address code and the data in the block following that next address code are read, and then the motor is stopped. How the aforesaid conditions and requirements are accommodated and met is apparent from the following more specific description of the circuits of FIG. 11.

If button 46 is displaced so that the armature of switch 362 contacts terminal 365, motor drive circuits 366 will control motor 242 to drive the tape 18 in cassette 240 forward at a relatively fast speed, e.g., 10 times faster than the normal read/write speed. If button 46 is manipulated so that the armature of switch 362 contacts terminal 370, the motor circuits 366 will drive the tape 18 forward at a relatively slow, i.e., normal, speed suitable for reading and writing. Similarly, if button 47 is manipulated so that the armature of switch 364 closes on contacts 372 or 373, the motor circuits will cause the motor to drive the tape 18 backwardly at predetermined, relatively high or slow speeds respectively. If the tape 18 is driven forward in the high speed mode or backward in the fast or slow speed modes, the address codes are not readily decipherable. Nevertheless, the output of amplifier 246, while it may not be decipherable, still is capable of triggering the address monostable vibrator 378 so that its output is a pulse representing the envelope of the address signals detected from the tape 18 by the read/write head. Each such pulse, when applied to gates 368 and 376, will be transferred to the increment or decrement lines 368 and 376 and hence will increment or decrement the state of the counter 354A according to whether switch 362 or switch 373 is operated. It is believed obvious that although the monostable multivibrator or one-shot 378 will provide a pulse corresponding to every address seen in the fast forward, fast reverse or slow reverse motion of the tape 18, that pulse will not be passed by gates 368 or 376 as the case may be unless those gates are enabled by appropriate signals indicating appropriate positions of the tape move buttons 46 and 47.

Assume now that flip-flop 490 has been cleared by a signal applied at terminal 193, and that switch 362 has been actuated so that its armature contacts fast forward terminal 365. As a result, motor 242 causes the tape to be transported in the fast forward mode. Since flip-flop 490 is in the cleared state, its Q terminal is low. Thus the clear terminal of flip-flop 496 is high, with the result that its Q terminal and the Enable Read Data line 274 are low. Hence the demultiplexer 262 cannot read data. Also, since the Q terminal of flip-flop 490 is low and the $\overline{Q}$ terminal of flip-flop 496 is high, the output line of gate 498 is low. Accordingly, the demultiplexer 262 cannot read addresses. It is apparent that flip-flop 496 is clocked by the output of one-shot 378. However, it is kept cleared by the low level signal appearing on the Q terminal of flip-flop 490.

Assume now that button 46 is released so that the armature of switch 362 opens with respect to switch terminal 365. When this occurs, the negative-going transition produced by opening switch 362 toggles flip-flop 490, with the result that the latter's Q terminal and line 494 go high. As a consequence, the motor drive circuits shift motor 242 to the slow forward mode. At the same time the Clear terminal of flip-flop 496 goes low. However, flip-flop 496 maintains its state so that its $\overline{Q}$ terminal is still high. As a result, gate 498 produces an Enable Read Address signal on line 500, whereby the demultiplexer 262 is enabled to read the next address. Simultaneously, the Enable Read Data line 274 is low since the Q terminal of flip-flop 496 is still low. The address read by the demultiplexer is applied by its four output lines to the counters 354A–C.

As soon as the next address is read, the output of the Address monostable multivibrator 378 clocks flip-flop 496, whereupon it changes states so that its Q and $\overline{Q}$ terminals go high and low respectively. Since the Q terminal of flip-flop 490 is still high, the output line of gate 498 will go low. However, since line 274 is now high, demultiplexer 262 (FIG. 7) is enabled to accept data read from the next data block.

The flip-flops 490 and 496 maintain their states until reading of the data block passing in the slow forward mode past the read/write head has been completed. At that point the 200 counter 190 produces an output signal which appears at terminal 193 to clear flip-flop 490. This results in its Q terminal going low and consequently the motor drive circuits cause the motor 252 to stop. The change in the voltage level of the Q terminal of flip-flop 490 causes flip-flop 496 to be cleared. Hence the Enable Read Data line 274 goes low and the $\overline{Q}$ terminal of flip-flop 490 goes high. Since the Q terminal of flip-flop 490 is low, gate 498 is disabled and no Enable Read Address signal appears on line 500. As a result, the demultiplexer is disabled.

The same mode of operation, i.e., automatic transfer to slow forward mode to automatically read the next data block with its associated record, occurs when operation in the backward fast or slow mode is terminated. However, irrespective of what signals appear on lines 274 and 500, increment and decrement counter signals are produced each time the Address one-shot 378 puts out a pulse, so that the counters 354A–C change count even though address and data cannot be read as such during fast forward or slow or fast reverse operation.

Consider now operation in the slow forward mode. In this mode it is desired to be able to continuously read both data and addresses (therefore, there is no need to increment or decrement the counters 354A–C). Assume again that flip-flop 490 is cleared so that its $\overline{Q}$ terminal is high and the armature of switch 362 is positioned as shown. As a result, flip-flop 496 is held clear and its $\overline{Q}$ terminal is high. Consequently, the demultiplexer 262 is not enabled and thus cannot read either data or address information. Fast Forward button 46 is now manipulated to cause switch 362 to close on its forward contact 370. When this occurs, flip-flop 490 is preset, so its Q terminal goes high, and as a result, the Clear terminal of flip-flop 496 goes low; but flip-flop 496 cannot change state until the next output pulse is produced by one-shot 378. Therefore, since both of its input lines are now high, gate 498 will cause line 500 to go high. This enables the demultiplexer to read an address and to enter it into the counters 354A–C. The reading of an address by demultiplexer 262 is accompanied by generation of an output pulse by the one-shot 378 which toggles, i.e., clocks, flip-flop 496. This causes the Q terminal of the latter and thus line 274 to go high, whereby the demultiplexer is enabled to read data from the data block associated with the previously read address. When line 274 goes high, the Enable Read Address line 502 goes low since the Q terminal of flip-flop 490 is still high.

When the data block has been fully read, counter 190 will again produce an output pulse at terminal 193. This clears flip-flop 490 so that its Q terminal goes low again and thereby clears flip-flop 496. Hence once again the demultiplexer is disabled so that neither data nor addresses can be read. However, the output pulse of counter 190 is of short duration. As soon as it passes, flip-flop 490 is again preset by the still closed switch 362. Hence the Q terminal of flip-flop 490 again goes high and thus gate 498 again enables the demultiplexer so that it can read the next address. The reading of the next address is followed again by toggling of flip-flop 496, whereby the Enable Read Data line again goes high and the Enable Read Address line again goes low. The foregoing mode of operation of flip-flops 490 and 496 continues to permit continuous reading of addresses and data so long as switch 362 is held closed on slow forward contact 370. If it is allowed to reopen while data is being read, the motor will continue operating until reading of a data block is completed, whereupon flip-flop 490 will be cleared and line 494 will go low to cause the motor circuits 366 to stop motor 242.

Operation of the display section of the system of FIG. 11 will now be described. As noted previously, counter 354A will increment or decrement automatically according to the signals appearing on lines 359 and 358 respectively each time an address is read during operation in the fast forward, fast backward or slow backward modes. The increment and decrement lines of counter 354B is connected to counter 354A so that the former will register one up or one down count each time the latter shifts up or down respectively by a count of 10. Counter 354C is connected to respond similarly to each 10 count change of counter 354B.

In the slow forward mode, the counters are preset by the signals appearing on the four output lines of the demultiplexer 262, and are enabled by gates 512A–C which are controlled by flip-flops 506 and 508. The latter, coacting with the ICG pulses on line 268, cause counters 354A, B and C to be loaded with the first, second and third digits respectively of the read address. The first ICG pulse will load the first digit; the second ICG pulse, the second digit; and the third ICG pulse, the third digit. The counters can respond only to address codes but not data codes. This mode of operation is achieved as hereafter described.

Assume that Enable Read Address line 502 is low, in which case flip-flops 506 and 508 are both held in the cleared state so that their $\bar{Q}$ terminals are both high. Assume now that Enable Read Address line 502 is caused to go high and that the motor 242 is operating in the slow forward mode (either as a result of opening switch contacts 365, 372 or 373 or closing of switch contact 370 as previously described). The phase decoder will generate an ICG signal for each digit of the address code being read. On the leading positive-going edge of the first ICG signal, gate 512A will load counter 354A since the $\bar{Q}$ terminals of flip-flops 506 and 508 are both high. Hence counter 354A will act through decoder 360A to cause display 28A to display the least significant or units digit. On the trailing negative-going edge of the first ICG signal, flip flop 506 will change states so that its Q and $\bar{Q}$ terminals go high and low respectively. The change in state of the Q terminal of flip-flop 506 will not clock flip-flop 508 and hence its state will remain the same. On the leading edge of the second ICG signal, gate 512B will load counter 354B since the Q and $\bar{Q}$ terminals of flip-flops 506 and 508 will both be high. As a result the display unit 28B will display the next significant digit of the address code. The trailing edge of the same ICG signal will cause flip-flop 506 to change states so that its Q terminal will go low and thereby clock flip-flop 508 so that it too changes states. Hence on the leading edge of the third ICG signal, gate 512C will load counter 354C with the most significant or hundreds digit since the Q and $\bar{Q}$ terminals of flip-flops 506 and 508 are both high. The two flip-flops are cleared by the Enable Read Address line going low again which occurs when flip-flop 496 is clocked to enable the shift register demultiplexer to process data read from the data block associated with the address indicated by the display units 28A-C. It is to be noted that decoders 360A-C are of a known type which holds the display on until new BCD address signals are loaded into counters 354A-C.

What is claimed is:

1. A data retrieval system comprising:

mass storage means for storing data in a plurality of data blocks with each block having a fixed capacity for storage of said data and having associated therewith a unique address code;

means for sensing and reading data contained in said blocks and also the address codes associated with said blocks and for providing electrical data and address signals corresponding to said data and said address codes;

said mass storage means and said reading means being disposed for relative movement in either of two opposite directions so that said reading means can scan said blocks and their associated address codes in sequence;

transport means for effecting said relative movement in either of said directions;

transport control means for selectively operating said transport means so as to effect said relative movement selectively in one or the other of said directions;

display means adapted to provide a display indicative of the address of a data block;

first display control means for operating said display means so as to change said display by one increment each time an address code is scanned by said reading means during relative movement in one of said directions; and second display control means responsive to said electrical address signals for setting said display means to a predetermined display established responsively to each of said electrical address signals as the latter are provided in accordance with the scan of said address codes by said reading means during relative movement in the other of said directions.

2. A data retrieval system as defined in claim 1 wherein said transport means is adapted to effect relative movement in said one direction at either of two different speeds, and further wherein said transport control means comprises means for operating said transport means so as to selectively effect said one direction movement at one or the other of said two different speeds.

3. A data retrieval system as defined in claim 1 wherein said transport control means includes first means for terminating said relative movement in said one direction and for thereafter automatically initiating relative movement in said other direction, and second means responsive to said first means for continuing said other direction movement long enough for a single address code and all of the data in the data block associated with said single address code to be read by said reading means and for terminating said other direction movement immediately after the last of the data in the block associated with said single address code has been read by said reading means.

4. A data retrieval system as defined in claim 3 wherein said data blocks are arranged in a fixed sequence and data is stored in said blocks in serial fashion.

5. A data retrieval system as defined in claim 4 wherein said reading means is presented with said data blocks and said address codes only alternatively for conversion to said electrical signals.

6. A data retrieval system as defined in claim 1 wherein said first and second display control means comprises a presettable counter adapted to change its count incremently responsively to application thereto of an input pulse, and further including means for applying an input pulse to said counter each time an address code is scanned by said reading means during relative movement in said one direction, and means responsive to electrical address signals produced by said reading means during relative movement in said other direction for presetting said counter to accord with each of said electrical address signals.

7. A data retrieval system according to claim 6 wherein input pulses are applied to said counter only during relative movement in said one direction.

8. A data retrieval system for searching an elongate mass storage means bidirectionally at high and low speeds comprising:

an elongate mass storage means for storing data in a plurality of data storage blocks each having a fixed maximum capacity for storage of data and each having associated therewith a unique stored address code;

reading means for sensing and reading the data and address codes stored in said mass storage means and for producing electrical data and address signals corresponding to said stored data and address codes;

bidirectionally operable transport means for transporting said mass storage means past said reading means;

transport control means comprising first selectively operable means for operating said transport means in a first mode whereby said mass storage means is transported in a first direction at a relatively high speed, second selectively operable means for operating said transport means in a second mode whereby said mass storage means is transported in said first direction at a relatively slow speed, third selectively operable means for operating said transport means in a third mode whereby said mass storage means is transported in a second opposite direction at a relatively high speed, and fourth selectively operable means for operating said transport means in a fourth mode whereby said mass storage means is transported in said second direction at a relatively slow speed; and means operable when operation of said transport means in any of said first, second or third modes is terminated for automatically initiating operation of said transport means in said fourth mode and for terminating operation in said fourth mode after a single address code and the data stored in the data storage block associated with said single address code have been read by said reading means.

9. A system according to claim 8 wherein said transport control means comprises manually operable switch means for operating said four selectively operable means for operating said transport means.

10. A system according to claim 8 wherein the data and address codes stored in said mass storage means are decipherable by said reading means only when said mass storage means is being transported according to said fourth mode.

11. A system according to claim 8 further including display means responsive to said reading means for providing a visual display indicative of the address of the data block being scanned by said reading means.

12. A system according to claim 11 wherein said address codes represent numerical addresses and said display means provides a decimal display.

13. A system according to claim 12 including a counter for controlling said display means, means for decrementing said counter by a count of one each time an address code is sensed by said reading means when operating in either of said first and second modes and for incrementing said counter by a count of one each time an address code is sensed by said reading means when operating in said third mode, and means coupling said counter and display means for changing said decimal display according to the change in count by said counter.

14. A system according to claim 13 further including means responsive to said reading means when operating in said fourth mode for setting said counter directly to a count corresponding to the particular numerical address read by said reading means.

15. Apparatus for storing and retrieving data comprising:

a magnetic tape mass storage means having a series of unique address codes recorded thereon;

read/write means for (*a*) recording data onto and reading data from said mass storage means and (*b*) reading said unique address codes;

transport means for bidirectionally transporting said mass storage means past said read/write means;

means for selectively operating said read/write means when said mass storage means is being transported in a first direction so as to record data thereon in discrete blocks with each block having one of said unique address codes associated therewith;

means for selectively operating said read/write means when said mass storage means is being transported in said first direction so as to read said blocks of data and said unique address codes;

first selectively operable transport control means for operating said transport means so that it transports said mass storage means in said first direction past said read/write means;

second selectively operable transport control means for operating said transport means so that it transports said mass storage means in a second opposite direction past said read/write means; and means responsive to termination of operation of said second transport control means for automatically operating said transport means so that it transports said mass storage means in said first direction and for automatically terminating operation of said transport means after said mass storage means has travelled far enough in said first direction for one address code and all of the data in the data block associated with said one address code to be read by said read/write means.

16. Apparatus according to claim 15 further including means responsive to said read/write means for displaying the address associated with each data block as said each data block is being read by said read/write means.

17. A data retrieval system adapted to search a mass data storage means bidirectionally to locate recorded data and to retrieve located data, said system comprising:

a mass storage means for storing serially phase-encoded data in a plurality of data storage blocks each having a fixed data storage capacity and arranged in a fixed sequence, each of said data blocks having associated therewith a unique serially phase-encoded address;

reading means for reading the data stored in said blocks and the address associated with said blocks and for converting said data and addresses to corresponding serially phase-encoded electrical data and address signals;

bidirectionally operable transport means for moving said mass storage means past said reading means;

selectively operable transport control means for selectively operating said transport means so as to selectively move said mass storage means in a first direction or a second opposite direction past said reading means;

phase decoder means for phase decoding the electrical signals produced by said reading means;

demultiplexer means for converting the phase decoded electrical signals produced by said phase decoder means to parallel coded electrical signals;

means for applying said parallel coded electrical signals to an output terminal device;

means operative only when said mass storage means is moving in said first direction for enabling said demultiplexer to convert phase decoded electrical signals to parallel coded electrical signals; and additional means operative when said transport control means is operated to cause said transport means to terminate movement of said mass storage means in said second direction for automatically causing said transport means to move said mass storage means in said first direction and to terminate the movement in said first direction after said reading means has read a single address and all of the data in the data block associated with said single address.

18. A data retrieval system according to claim 17 further including:

a presettable bidirectional counter;

means for displaying the count stored in said counter;

means responsive to said reading means for generating a control pulse each time an address is read by said reading means;

means for incrementing or decrementing said counter according to the direction of movement of said mass storage means each time a control pulse is generated;

means coupled to said demultiplexer for setting said counter responsively to parallel coded electrical signals produced by said demultiplexer; and means for enabling said counter to respond to the output of said demultiplexer only when said output is derived from electrical address signals produced by said reading means during movement of said mass storage means in said first direction.

19. A data retrieval system according to claim 17 wherein:

said transport means is capable of moving said mass storage means in each of said directions at a relatively fast or a relatively slow speed;

said transport control means includes means for selectively operating said transport means at either of said speeds in each of said directions; and said additional means is operative, when said transport control means is operated to cause said transport means to terminate relatively fast speed movement of said storage means in said first direction, for automatically causing said transport means to move said mass storage means at said relatively slow speed in said first direction and to terminate such movement in said first direction after said reading means has read a single address and all of the data in the data block asssociated with said single address.

20. A data retrieval system according to claim 19 further including:

a presettable bidirectional counter;

means for displaying the counts stored in said counter;

means responsive to said reading means for generating a control pulse each time an address is read by said reading means;

means for incrementing said counter each time a control pulse is generated during movement of said mass storage means in said first direction at said relatively fast speed;

means for decrementing said counter each time a control pulse is generated during movement of said mass storage means in said second direction at either said relatively fast or said relatively slow speed;

means coupled to said demultiplexer for setting said counter responsively to parallel coded electrical signals produced by said demultiplexer; and means for enabling said counter to respond to the output of said demultiplexer only when said output is derived from electrical address signals produced by said reading means during movement of said mass storage means in said first direction at said relatively slow speed.

21. A data retrieval system as defined in claim 1 wherein said transport means is adapted to effect relative movement in said other direction at either of two different speeds, said transport control means includes means for operating said transport means so as to selectively effect said movement in said other direction at either one or another of said two different speeds, said display control means comprises a presettable counter adapted to change its count incrementally responsively to application thereto of an input pulse, said display control means also includes means for applying an input pulse to said counter each time an address code is scanned by said reading means during relative movement at the faster of said speeds in said other direction, and means for producing said electrical address signals by said reading means during relative movement in said other direction at the slower of said speeds and for applying said address signals so as to preset said counter in accordance therewith.

* * * * *